(12) United States Patent
Shatsky et al.

(10) Patent No.: US 11,675,789 B2
(45) Date of Patent: Jun. 13, 2023

(54) TRACKING UTILIZATION OF DATA BLOCKS IN A STORAGE SYSTEM

(71) Applicant: EMC IP Holding Company LLC, Hopkinton, MA (US)

(72) Inventors: Yosef Shatsky, Karnei Shomron (IL); Doron Tal, Geva Carmel (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 120 days.

(21) Appl. No.: 17/361,666

(22) Filed: Jun. 29, 2021

(65) Prior Publication Data
US 2022/0414102 A1 Dec. 29, 2022

(51) Int. Cl.
*G06F 16/2455* (2019.01)
*G06F 16/22* (2019.01)
*G06F 12/02* (2006.01)
*G06F 16/27* (2019.01)
*G06F 16/215* (2019.01)

(52) U.S. Cl.
CPC .... *G06F 16/24552* (2019.01); *G06F 12/0253* (2013.01); *G06F 16/215* (2019.01); *G06F 16/2246* (2019.01); *G06F 16/278* (2019.01)

(58) Field of Classification Search
CPC .......... G06F 16/24552; G06F 16/2246; G06F 16/215; G06F 16/278; G06F 12/0253
See application file for complete search history.

(56) References Cited

U.S. PATENT DOCUMENTS

| 5,381,539 | A | 1/1995 | Yanai et al. |
| 5,551,003 | A | 8/1996 | Mattson et al. |
| 5,764,880 | A | 6/1998 | Gerdt et al. |
| 6,052,799 | A | 4/2000 | Li et al. |
| 6,941,420 | B2 | 9/2005 | Butterworth et al. |

(Continued)

FOREIGN PATENT DOCUMENTS

WO 2015108670 A1 7/2015
WO PCT/US2019/024885 1/2020

(Continued)

OTHER PUBLICATIONS

Dell EMC, "Dell EMC VxRack FLEX," Dell EMC Product Overview, 2018, 5 pages.

(Continued)

*Primary Examiner* — Huawen A Peng
(74) *Attorney, Agent, or Firm* — Ryan, Mason & Lewis, LLP

(57) ABSTRACT

A storage control system manages a utilization of data blocks of a storage volume which is partitioned into data blocks having a unique block identifier (ID) and a same block size. The storage control system receives data items and assigns a respective unique data ID to each data item, which include consecutive data IDs. The data items are written to a free data block as a whole, and a record for the written data block is inserted into a node of a first tree structure. The record includes the unique block ID of the written data block, a first data ID of the data items, and a bitmap which maps the consecutive data IDs of the data items in the written data block, starting from the first data ID, to a respective bit whose value indicates whether the data item associated with the data ID is valid or invalid.

20 Claims, 9 Drawing Sheets

(56) References Cited

U.S. PATENT DOCUMENTS

| | | | |
|---|---|---|---|
| 8,843,676 | B2 | 9/2014 | Rajamanickam et al. |
| 9,317,213 | B1* | 4/2016 | Gupta ................... G06F 3/067 |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2012/0311557 | A1* | 12/2012 | Resch ................... G06F 11/10 717/171 |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1 | 8/2014 | Ezra et al. |
| 2014/0281550 | A1* | 9/2014 | Resch ................... H04L 9/0863 713/171 |
| 2016/0103764 | A1 | 4/2016 | Banerjee et al. |
| 2017/0031749 | A1* | 2/2017 | Gupta ................... G06F 3/067 |
| 2017/0364414 | A1* | 12/2017 | Pogosyan ............ G06F 16/9027 |
| 2018/0107402 | A1* | 4/2018 | Pogosyan ........... G06F 11/1448 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2018/0314599 | A1* | 11/2018 | Aron ................... H04L 61/30 |
| 2019/0121562 | A1* | 4/2019 | Dobbels ................. G06F 3/067 |
| 2019/0163587 | A1 | 5/2019 | Anna et al. |
| 2019/0227845 | A1 | 7/2019 | Sridhar et al. |
| 2020/0133503 | A1 | 4/2020 | Sun et al. |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2022/0121365 | A1* | 4/2022 | Wang ................... G06F 3/067 |
| 2022/0156231 | A1* | 5/2022 | Wang ................... G06F 16/164 |
| 2022/0188288 | A1* | 6/2022 | Dereszynski ......... G06F 16/178 |
| 2022/0335027 | A1* | 10/2022 | Subramanian Seshadri ................ G06F 16/128 |
| 2022/0358019 | A1* | 11/2022 | Grunwald ............ G06F 16/275 |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (ComputerScience)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting To Know Dell EMC PowerFlex," Version 3.5.x, Rev. 02, Jan. 2021, 66 pages.

U.S. Appl. No. 16/807,709 filed in the name of Avi Puder et al. on Mar. 3, 2020, and entitled "Management of Shared Resources in a Software-Defined Storage Environment.".

U.S. Appl. No. 16/822,818 filed in the name of Itay Keller et al. on Mar. 18, 2020, and entitled "Storage System Implementing Snapshot Longevity Ranking for Efficient Management of Snapshots.".

U.S. Appl. No. 16/822,848 filed in the name of Itay Keller et al. on Mar. 18, 2020, and entitled "Assignment of Longevity Ranking Values of Storage vol. Snapshots Based on Snapshot Policies.".

U.S. Appl. No. 16/823,813 filed in the name of Itay Keller et al. on Mar. 19, 2020, and entitled "Managing Incompressible Data in a Compression-Enabled Log-Structured Array Storage System.".

U.S. Appl. No. 16/830,469 filed in the name of Roi Tagar et al. on Mar. 26, 2020, and entitled "Storage Block Balancing Using Volume Part Migration.".

U.S. Appl. No. 16/830,473 filed in the name of Yugal Peleg Lieblich et al. on Mar. 26, 2020, and entitled "Replicated State Cluster with Standby Node State Assessment During Leadership Transition.".

U.S. Appl. No. 16/830,946 filed in the name of Gil Ben Zeev et al. on Mar. 26, 2020, and entitled "Storage Volume Migration Scheduling Based on Storage Volume Priorities and Specified Constraints.".

U.S. Appl. No. 16/832,763 filed in the name of Michal Yarimi et al. on Mar. 27, 2020, and entitled "Managing Storage Device Errors During Processing of Inflight Input/Output Requests.".

U.S. Appl. No. 16/834,363 filed in the name of Itay Keller et al. on Mar. 30, 2020, and entitled "Managing Least Recently Used Cache Using Reduced Memory Footprint Sequence Container.".

U.S. Appl. No. 16/836,824 filed in the name of Itay Keller et al. on Mar. 31, 2020, and entitled "Management of Volume Snapshots in a Data Storage System.".

U.S. Appl. No. 16/888,742 filed in the name of Rivka Matosevich et al. on May 31, 2020, and entitled "Balancing Resiliency and Performance by Selective Use of Degraded Writes and Spare Capacity in Storage Systems.".

U.S. Appl. No. 16/918,654 filed in the name of Rivka Matosevich et al. on Jul. 1, 2020, and entitled "Sharing Memory Resources Between Asynchronous Replication Workloads.".

U.S. Appl. No. 16/983,423 filed in the name of Dan Aharoni et al. on Aug. 3, 2020, and entitled "Deferred Reclamation of Invalidated Entries that are Associated with a Transaction Log in a Log-Structured Array.".

U.S. Appl. No. 17/065,754 filed in the name of Dan Aharoni et al. on Oct. 8, 2020, and entitled "Direct Response to IO Request in Storage System with Remote Replication.".

U.S. Appl. No. 17/070,073 filed in the name of Dan Aharoni et al. on Oct. 14, 2020, and entitled "Direct Response to IO Request in Storage System Having an Intermediary Target Apparatus.".

(56) References Cited

OTHER PUBLICATIONS

U.S. Appl. No. 17/070,288 filed in the name of Anurag Sharma et al. on Oct. 14, 2020, and entitled "Pipeline-Based System for Configuration Checking and Reporting Associated with an Information Processing System.".
U.S. Appl. No. 17/071,407 filed in the name of John Moran et al. on Oct. 15, 2020, and entitled "Dynamic Remediation Actions in Response to Configuration Checks in an Information Processing System.".
U.S. Appl. No. 17/077,105 filed in the name of Yosef Shatsky et al. on Oct. 22, 2020, and entitled "Volume Tiering in Storage Systems.".
U.S. Appl. No. 17/106,988 filed in the name of Rivka Matosevich et al. on Nov. 30, 2020, and entitled "Managing Host Connectivity to a Data Storage System.".
U.S. Appl. No. 17/123,525 filed in the name of Itay Keller et al. on Dec. 16, 2020, and entitled "Deferred Reclamation of Invalidated Entries Associated with Replication in a Log-Structured Array.".
U.S. Appl. No. 17/145,646 filed in the name of Yosef Shatsky et al. on Jan. 11, 2021, and entitled "Redistribution of Processing Groups between Server Nodes Based on Hardware Resource Utilization.".
U.S. Appl. No. 17/232,203 filed in the name of Roman Spiegelman on Apr. 16, 2021, and entitled "Object Synchronization of Server Nodes in a Network Computing Environment.".
U.S. Appl. No. 17/236,256 filed in the name of Doron Tal et al. on Apr. 21, 2021, and entitled "Recovery from Partial Device Error in Data Storage System.".
U.S. Appl. No. 17/306,601 filed in the name of Rivka Matosevich et al. on May 3, 2021, and entitled "Managing Replication Journal in a Distributed Replication System.".
U.S. Appl. No. 17/308,166 filed in the name of Adi Bar Shalom et al. on May 5, 2021, and entitled "Journal Barrier Consistency Determination.".
U.S. Appl. No. 17/351,733 filed in the name of Yosef Shatsky et al. on Jun. 18, 2021, and entitled "Data Deduplication in a Disaggregated Storage System.".
U.S. Appl. No. 17/511,699 filed in the name of Yosef Shatsky et al. on Oct. 27, 2021, and entitled "Metadata Management in Storage Systems.".

* cited by examiner

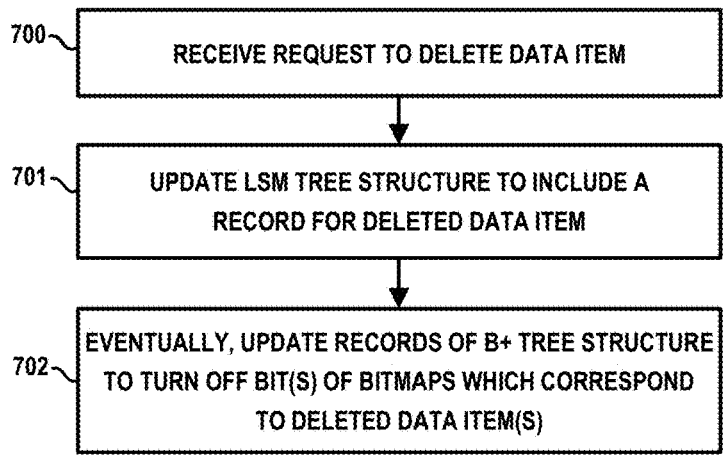
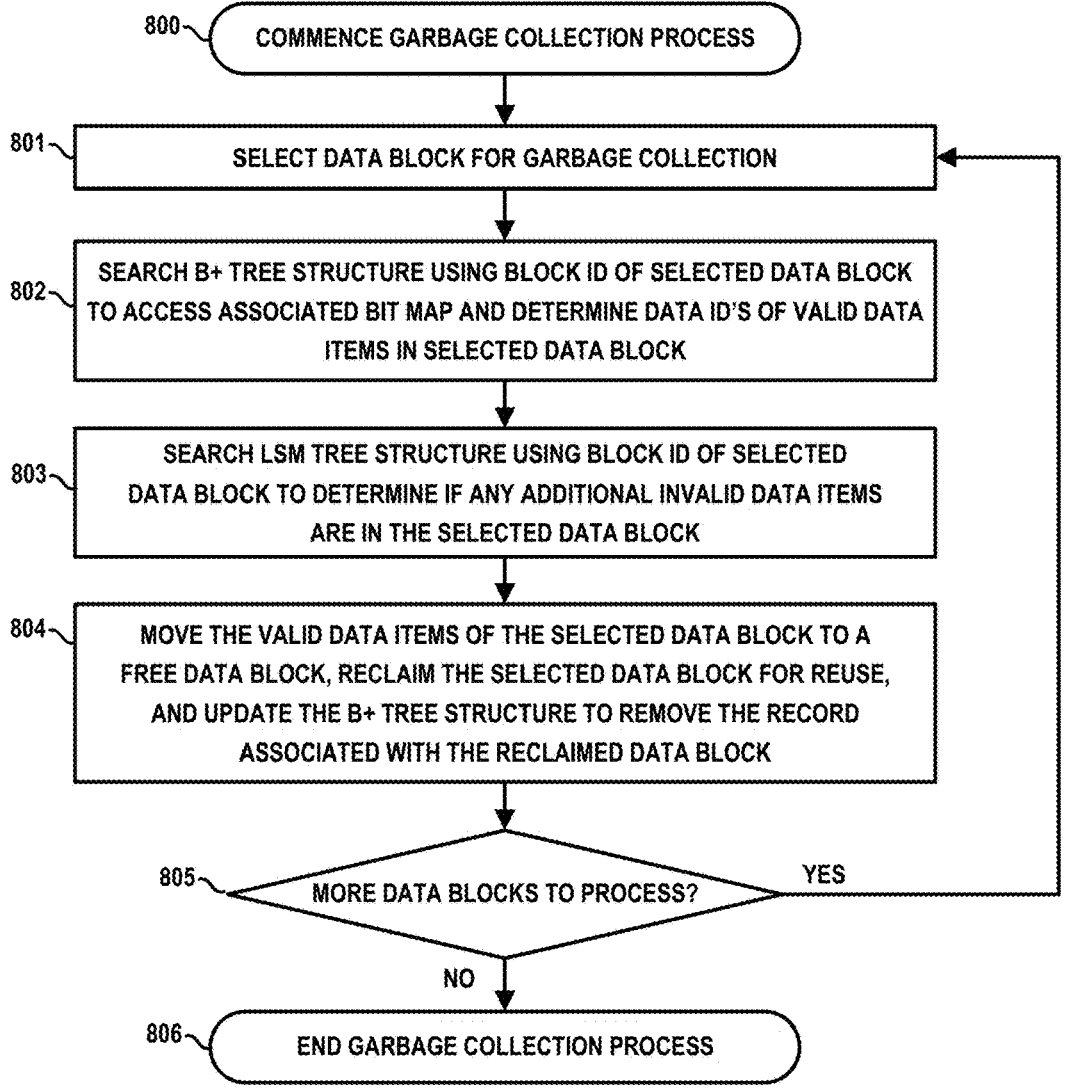

FIG. 9A

900 Block_ID = 2

| FD_ID | 550 | | | | | | | | | |
|---|---|---|---|---|---|---|---|---|---|---|
| Bits | 1 | 1 | 1 | 1 | 1 | 1 | 1 | 1 | 1 | 1 |

| Data_IDs | 550 | 551 | 552 | 553 | 554 | 555 | 556 | 557 | 558 | 559 |

900 Block_ID = 2

| FD_ID | 550 | | | | | | | | | |
|---|---|---|---|---|---|---|---|---|---|---|
| Bits | 1 | 0 | 1 | 1 | 0 | 1 | 0 | 1 | 0 | 1 |

| Data_IDs | 550 | x | 552 | x | 554 | x | 556 | x | x | 559 |

910 Block_ID = 4

| FD_ID | 880 | | | | |
|---|---|---|---|---|---|
| Bits | 0 | 0 | 1 | 1 | 0 | 0 | 1 |

| Data_IDs | x | x | 882 | x | 884 | 885 | 886 | x | x | 889 |

920 Block_ID = 10

| FD_ID | 550 | | | | | | | | | | 882 | | | | | | | |
|---|---|---|---|---|---|---|---|---|---|---|---|---|---|---|---|---|---|---|
| Bits | 1 | 0 | 1 | 0 | 1 | 0 | 1 | 0 | 1 | 1 | 1 | 0 | 1 | 1 | 1 | 1 | 0 | 1 |

| Data_IDs | 550 | x | 552 | x | 554 | x | 556 | x | 559 | 882 | x | 884 | 885 | 886 | 889 |

921     922

TRACKING UTILIZATION OF DATA BLOCKS IN A STORAGE SYSTEM

TECHNICAL FIELD

This disclosure relates generally to data storage management techniques and, more particularly, to techniques for tracking utilization of storage capacity of a storage system.

BACKGROUND

Storage systems which provide features such as thin provisioning and data reduction utilize some form of internal layout for a physical data layer. Such storage systems employ a mapping mechanism from a logical layer (as understood by user volumes or files) to a physical layer that is used to store data. A storage controller may arrange data in the physical layer using various methods such as, e.g., packing data to conserve capacity, implementing a log-structured array, storage tiering, etc. Such methods may avoid performing "in-place updates" of data for several reasons. For example, if there is an error writing some data during an in-place write operation, both new and previous versions of the data are corrupted. Furthermore, when in-line data compression is implemented in a storage system to compress ingress data and store the compressed data to disk (and thereby increase disk storage utilization), a problem can arise when a given data item is updated and rewritten to the same storage location, as there is no guarantee that the compressed updated data will be able to fit in the same location on disk that was allocated to the older compressed data before the update. As such, an out-of-place update scheme is employed in which updated data is stored in a new location while the original copy is set as invalid. Over time, as old data is overwritten with new data via out-of-place updates, there is a need to track the utilization of the physical layer and allow fragmented data blocks with invalid data to be garbage collected so that the data blocks can be reclaimed for reuse.

SUMMARY

Exemplary embodiments of the disclosure include techniques for tracking utilization of data blocks in a storage system. For example, an exemplary embodiment includes a method that is performed by a storage control system for managing a utilization of data blocks of a storage volume, wherein at least a portion of the storage volume is partitioned into data blocks, wherein each data block comprises a unique block identifier (ID) and has a same block size. The storage control system receives data items to be stored in the storage volume and assigns a respective unique data ID to each data item, wherein the assigned data IDs comprise consecutive data ID values. The storage control system writes the data items to a free data block in the storage volume such that the free data block is written as a whole data block, and inserts a record for the written data block into a node of a first tree data structure. The record comprises (i) the unique block ID of the written data block, (ii) a first data ID of the consecutive ID values of the data items in the written data block, and (iii) a bitmap which maps the consecutive data ID values of the data items in the written data block, starting from the first data ID, to a respective bit whose value is set to indicate whether the data item associated with the data ID is valid or invalid.

Other embodiments of the disclosure include, without limitation, systems and articles of manufacture comprising processor-readable storage media, which are configured to track the utilization of data blocks in a storage system.

BRIEF DESCRIPTION OF THE DRAWINGS

FIG. 7 illustrates a flow diagram of a method for tracking the utilization of data blocks in a storage system, according to an exemplary embodiment of the disclosure.

FIG. 8 illustrates a flow diagram of a method for performing a garbage collection operation, according to an exemplary embodiment of the disclosure.

FIGS. 9A, 9B, 9C, and 9D schematically illustrate a method for performing a garbage collection operation, according to an exemplary embodiment of the disclosure.

DETAILED DESCRIPTION

Figure 1:
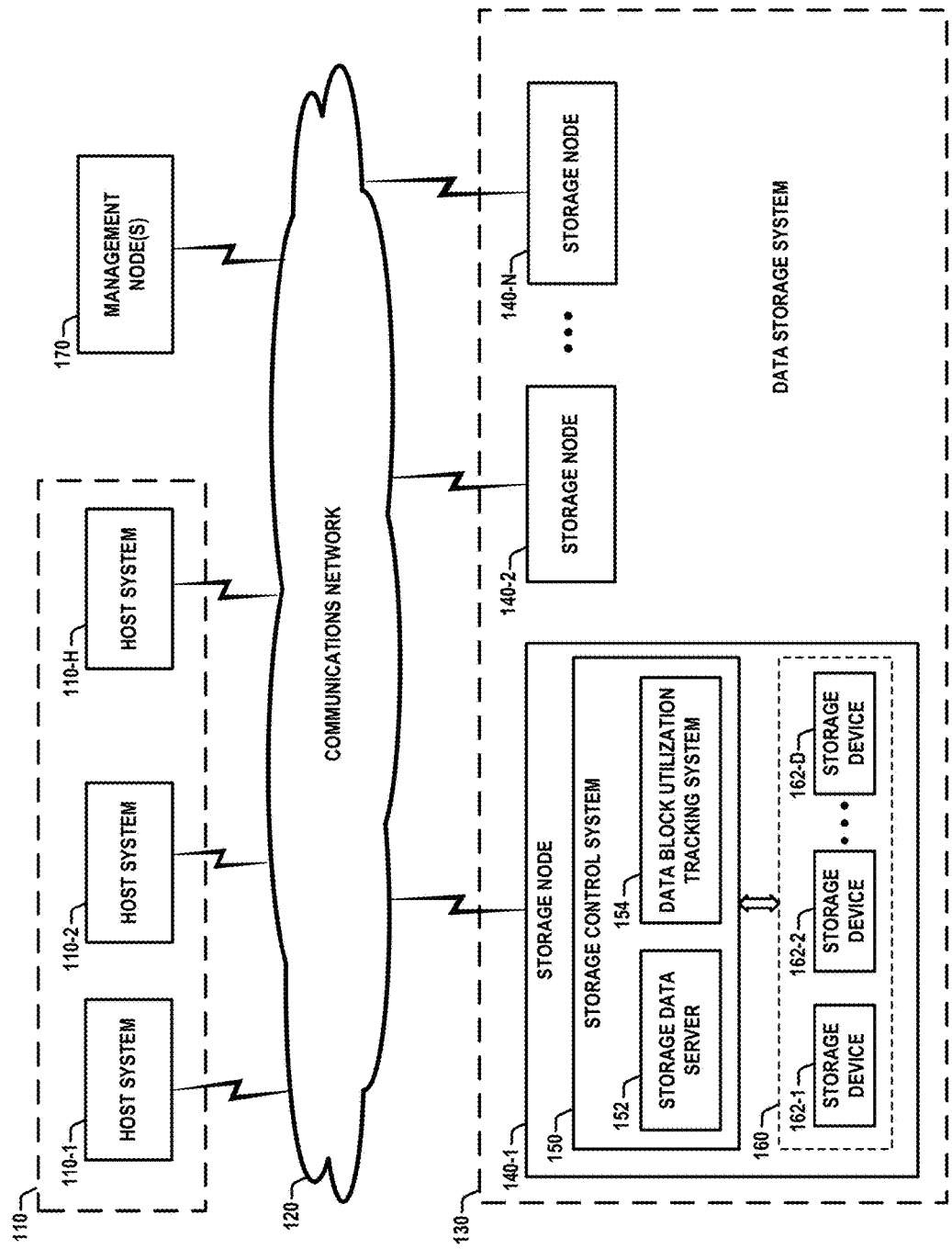
FIG. 1 schematically illustrates a network computing system comprising a data storage system which implements a data block utilization tracking system, according to an exemplary embodiment of the disclosure.

Exemplary embodiments of the disclosure will now be discussed in further detail with regard to systems and methods for tracking utilization of data blocks in a storage system. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein FIG. 1 schematically illustrates a network computing system 100 comprising a data storage system which implements a data block utilization tracking system, according to an exemplary embodiment of the disclosure. The network computing system 100 comprises one or more host systems 110-1, 110-2, . . . 110-H (collectively, host systems 110), a communications network 120, and a data storage system 130. The data storage system 130 comprises one or more storage nodes 140-1, 140-2, . . . , 140-N (collectively, storage nodes 140). As shown in FIG. 1, the storage node 140-1 comprises a storage control system 150, and a storage device array 160 comprising a plurality of storage devices 162-1, 162-2, . . . , 162-D (collectively, storage devices 162). In some embodiments, the other storage nodes 140-2 . . . 140-N have the same or similar configuration as the storage node 140-1 shown in FIG. 1. The storage control system 150 comprises a storage data server 152 and a data block utilization tracking system 154, the functions of which will be described in further detail below.

The network computing system 100 further comprises one or more management nodes 170. In general, the management nodes 170 implement application programming interfaces (APIs) to enable manual, automated, and/or semi-automated configuration, management, provisioning, and monitoring of the data storage system 130 and the associated storage nodes 140. In some embodiments, the management nodes 170 comprise stand-alone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in the storage devices 160 of the storage nodes 140 and (ii) read requests to access data that is stored in storage devices 160 of the storage nodes 140.

The communications network 120 is configured to enable communication between the host systems 110 and the storage nodes 140, and between the management nodes 170, the host systems 110, and the storage nodes 140, as well as to enable peer-to-peer communication between the storage nodes 140 of the data storage system 130. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network-attached storage (NAS) system, a direct-attached storage (DAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. It is to be noted that each storage node 140 and its associated array of storage devices 160 is an example of what is more generally referred to herein as a "storage system" or a "storage array." The storage nodes 140 can be physical nodes, virtual nodes, and a combination of physical and virtual nodes.

In some embodiments, the storage nodes 140 comprise storage server nodes (e.g., server node 900, shown in FIG. 9) having processor and system memory, and possibly implementing virtual machines and/or containers, although numerous other configurations are possible. In some embodiments, one or more of the storage nodes 140 can additionally implement functionality of a compute node, and vice-versa, wherein a compute node is configured to process data and execute tasks/workloads and perform computational work, either individually, or in a distributed manner, to thereby provide compute services such as execution of one or more applications on behalf of one or more users. In this regard, the term "storage node" as used herein is therefore intended to be broadly construed, and a storage system in some embodiments can be implemented using a combination of storage nodes and compute nodes.

In some embodiments, each storage node 140 comprises a server node that is implemented on, e.g., a physical server machine or storage appliance comprising hardware processors, system memory, and other hardware resources that execute software and firmware to implement the functionalities and data management services of the storage node 140 and the storage control system 150, as discussed herein. More specifically, in some embodiments, each storage node 140 comprises a plurality of storage control processors which execute a lightweight operating system (e.g., a customized lightweight Linux kernel) and functional software (e.g., software-defined storage software) to implement various functions of the storage node 140 and the storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the data storage system 130, etc.

In a distributed storage environment, the storage control systems 150 of the storage nodes 140 are configured to communicate in a cooperative manner to perform functions such as e.g., processing data access requests received from the host systems 110, aggregating/pooling the storage capacity of storage device arrays 160 of the storage nodes 140, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage devices 162 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 162 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the data storage system 130. In this regard, the term "storage device" as used herein should be broadly construed to encompass all types of persistent storage media including hybrid drives.

In some embodiments, the storage device array 160 of a given storage node 140 comprises DAS resources (internal and/or external), wherein the storage control system 150 of the given storage node 140 is configured to directly access the storage device array 160 of the given storage node 140. In some embodiments, the data storage system 130 comprises a disaggregated data storage system in which storage data processing is separate from data storage. More specifically, in an exemplary embodiment of a disaggregated storage system, the storage control systems 150 comprise storage control nodes, and the storage device arrays 160 comprises storage nodes, which are separate from the storage control nodes. In such configuration, the storage control nodes (e.g., storage control systems 150) are configured to handle the processing of data associated with data access requests (i.e., input/output (I/O) read and write requests), and the storage nodes (storage device arrays 160) are configured to handle writing/reading data to/from respective storage devices 162. In a disaggregated architecture, each storage control node (e.g., each storage control system 150) would be configured to directly access data stored in each storage node (e.g., each storage device array 160) in the data storage system 130. The disaggregated storage system architecture essentially separates the storage control compute layers (e.g., storage control systems 150) from the data storage layers (e.g., storage device arrays 160).

In a disaggregated data storage system, each storage node (e.g., each storage device array 160) is implemented as, e.g., external DAS device, wherein each storage control node (e.g., each storage control systems 150) of each storage node 140-1, 140-2, ..., 140-N is connected to each storage node (e.g., each storage device array 160) using any suitable interface protocol such as Small Computer Systems Interface (SCSI), Fibre Channel (FC), etc. In other embodiments, the storage control nodes (e.g., storage control systems 150) of each storage nodes 140-1, 140-2, ..., 140-N can be network-connected to each of the storage nodes (e.g., storage device arrays 160) (via a high-performance network fabric) using any suitable network configuration and network interface protocol such as Ethernet, FC, Internet Small Computer Systems Interface (iSCSI), InfiniBand, etc. For example, in some embodiments, the storage nodes 140 and the storage device arrays 160 are interconnected in a full-mesh network, wherein back-end interconnectivity between the storage nodes 140 and the storage device arrays 160 is achieved using, e.g., a redundant high-speed storage fabric, wherein the storage control systems 150 can utilize remote procedure calls (RPC) for control messages and remote direct memory access (RDMA) for moving data blocks.

In some embodiments, the storage data servers 152 of the storage nodes 140 are configured to consolidate the capacity of the storage device arrays 160 (e.g., HDDs, SSDs, PCIe or NVMe flash cards, etc.) of the storage nodes 140 into storage pools from which logical volumes are allocated, wherein the logical volumes (e.g., a block unit of storage management) are identified by, e.g., logical unit numbers (LUNs). More specifically, the storage data servers 152 of the storage nodes 140 are configured to create and manage storage pools (e.g., virtual pools of block storage) by aggregating storage capacity of the storage device arrays 160 of the storage nodes 140 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 152. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 152. The SDC provides the operating system or hypervisor (which runs the SDC) access to the logical block devices (e.g., volumes). Each SDC has knowledge of which storage data servers 152 hold (e.g., own) their block data, so multipathing can be accomplished natively through the SDCs.

As noted above, the management nodes 170 in FIG. 1 implement a management layer which manages and configures the network computing environment 100. In some embodiments, the management nodes 170 comprise a tightly-coupled cluster of manager nodes that are configured to supervise the operations of the storage cluster and manage storage cluster configurations. For example, management nodes 170 include metadata manager (MDM) modules that operate outside of the data path and provide the relevant information to the SDCs and the storage data servers 152 to allow such components to control data path operations. The MDM modules are configured to manage the mapping of SDCs to the storage data servers 152 of the storage nodes

140. The MDM modules manage various types of metadata that are required to perform various management operations in the storage environment such as, e.g., managing configuration changes, managing the SDCs and storage data servers 152, maintaining and updating device mappings, maintaining management metadata for controlling data protection operations such as snapshots, replication, RAID configurations, etc., managing system capacity including device allocations and/or release of capacity, performing operation for recovery from errors and failures, and system rebuild tasks including rebalancing, etc.

The data block utilization tracking system 154 is configured to track the utilization of blocks of physical memory in an exemplary storage framework in which the physical layer (internal layout of storage) of one or more storage volumes is divided in fixed-sized data blocks (e.g., 1 MB blocks), and wherein new data items are only written to empty data blocks, and wherein updated data items are only written to empty data blocks using "out-of-place" updates. An "out-of-place" update invalidates a current version of the data item being updated and writes the new version of the data item to a free data block. Over time, as existing data items are invalidated due to "out-of-place" updates of such data items, the data block utilization tracking system 154 implements methods to (i) generate and manage metadata which is used to track the utilization of the data blocks (e.g., track which data items in a given data block are valid and invalid), and (ii) utilize the metadata for functions such as capacity reporting, garbage collection, and other process that move or migrate data items of physical data blocks, to allow the capacity of data blocks to be reclaimed and reused. Exemplary systems and methods for tracking the data block utilization according to embodiments of the disclosure will now be discussed in further detail in conjunction with FIGS. 2-8.

Figure 2:
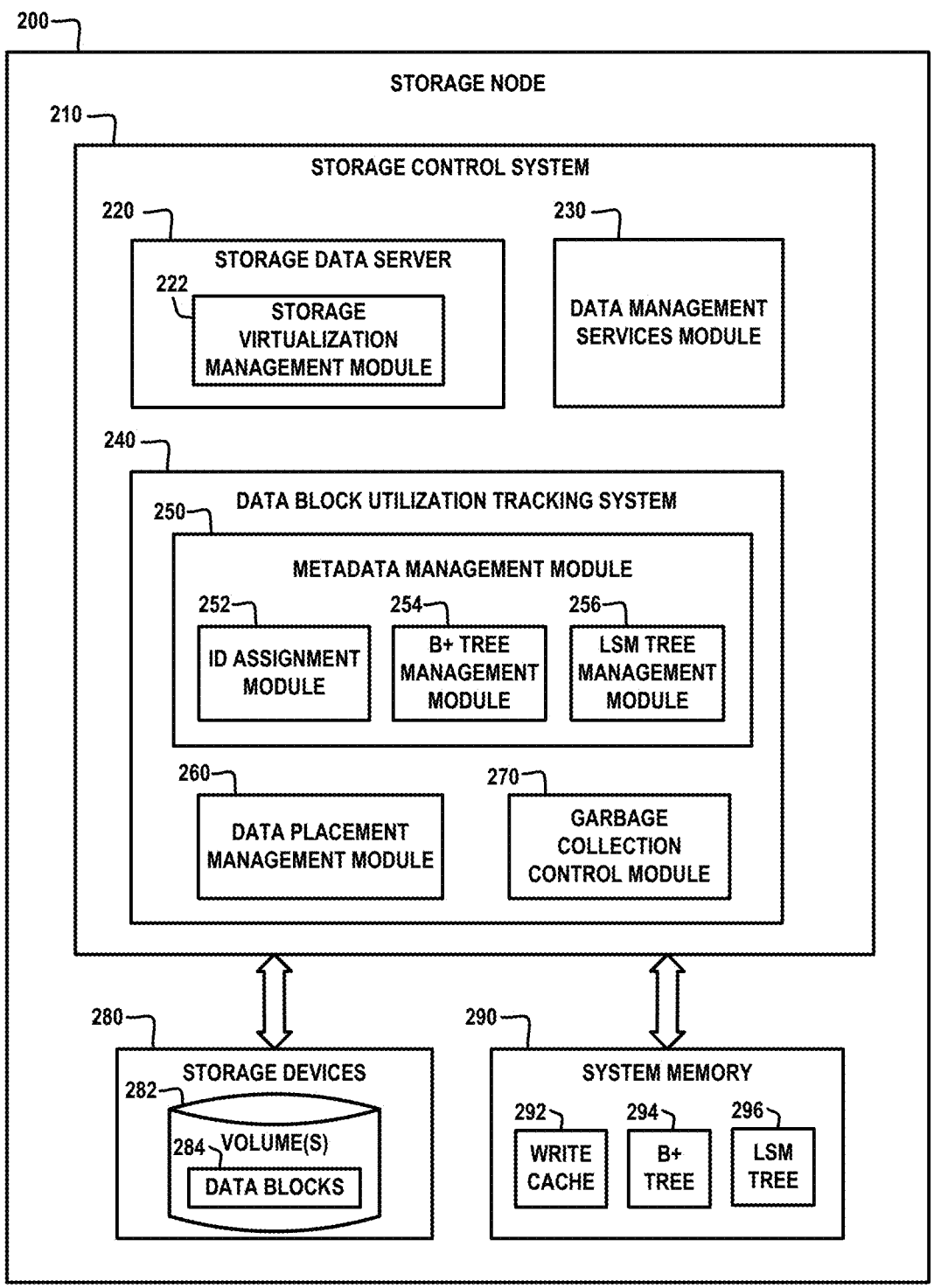
FIG. 2 schematically illustrates a storage node which comprises a data block utilization tracking system, according to an exemplary embodiment of the disclosure.

FIG. 2 schematically illustrates a storage node which comprises a data block utilization tracking system, according to an exemplary embodiment of the disclosure. In some embodiments, FIG. 2 schematically illustrate an exemplary architecture of the storage nodes 140 of the data storage system 130 of FIG. 1. As shown in FIG. 2, the storage node 200 comprises a storage control system 210 which implements a storage data server 220, a data management services module 230, and a data block utilization tracking system 240. The storage data server 220 comprises a storage virtualization management module 222. The data block utilization tracking system 240 comprises a metadata management module 250, a data placement management module 260, and a garbage collection control module 270. The metadata management module 250 comprises an identifier (ID) assignment module 252, a B+ tree management module 254, and a log-structured merge (LSM) tree management module 256. The storage node 200 further comprises an array of storage devices 280 and persistent system memory 290 (or non-volatile system memory). The storage devices 280 have capacity which is partitioned into one or more storage volumes 282 in which the physical storage is divided into fixed-sized data blocks 284. The persistent system memory 290 is configured to implement a write cache 292, and to store metadata in a B+ tree data structure 294 and a LSM tree data structure 296, to support the data block utilization tracking functions as discussed herein.

The storage data server 220 implements functions as discussed above such as processing I/O write and read requests received from host systems to write/read data to/from the storage devices 280. The storage virtualization management module 222 implements any suitable logical volume management (LVM) system which is configured to create and manage the storage volumes 282 by aggregating the capacity of the storage devices 280 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data. The data management services module 230 implements one or more types of data management services including, but not limited to, inline data compression/decompression, thin provisioning, and data protection functions such as data replication, data backup, data snapshot, and data protection and resiliency schemes based on data striping and/or parity (e.g., erasure coding, RAID, etc.), and other types of data management functions, depending on the system configuration. In embodiments where the storage data server 220 abstracts the physical media (e.g., storage devices 280) and presents logical (virtualized) addresses to users in the form of LUNs, the storage data server 220 generates and manages metadata to provide mapping between logical addresses and physical addresses. In addition, the storage control system 210 generates and manages metadata which is utilized for managing snapshots, change tracking for remote replication, managing deduplication pointers, managing data compression, etc.

The data block utilization tracking system 240 is configured to track the utilization of the data blocks 284 in storage volumes 282 of the storage device 280 in which the physical layout of one or more of the storage volumes 282 is divided into fixed-sized data blocks (e.g., 1 MB blocks), and wherein new data items are only written to empty data blocks, and wherein updated data items are only written to empty data blocks using "out-of-place" updates. In some embodiments, the metadata management module 250 implements the modules 252, 254, and 256 to generate and maintain various forms of metadata for purposes of tracking the utilization of the data blocks 284, e.g., track which data items in a given data block are valid or invalid. For example, the ID assignment module 252 is configured to generate and assign (i) a unique block identifier (referred to herein as "Block_ID") for each fixed-sized data block 284, and (ii) a globally unique internal data item ID for each new data item (referred to herein as "Data_ID") that is written to the storage system. The Block_IDs and Data_IDs are utilized to track data blocks and data items in the storage system.

In some embodiments, unique Block_IDs are assigned to respective data blocks 284 of a given storage volume at a time when the storage volume is allocated and partitioned into data blocks by the storage control system 210. For example, in some embodiments, assuming that the data blocks 284 are fixed-size data blocks of 1 MB, a Block_ID for a given data block comprises an index of the given block in storage, e.g., Block_ID 0→offset 0, Block_ID 1→offset 1 MB, Block_ID 2→offset 2 MB, etc. As explained in further detail below, the data blocks 284 are configured to store data items that are written to the data blocks 284 using "out-of-place" writes.

When incoming data is to be stored, the data is divided into data items of a given size (e.g., 4 KB, 8 KB, 16 KB, etc.) before data compression (if implemented). Each data item written to a data block is assigned a unique Data_ID. In some embodiments, the Data_IDs are incremental and continuously increased. A newly written data item will always have a higher Data_ID value than a previously written data item. Consecutively, the data items written to storage will have consecutive Data_IDs. As explained in further detail below, the assignment of unique, incremental Data_IDs to data items written to storage provides an efficient mechanism for tracking which data items (in a given data block) are valid or the valid and, consequently, an efficient method for tracking data block utilization.

In some embodiments, the ID assignment module 252 implements a data ID counter which is incremented by one for each data item that is written, e.g., when a new data it is written, the new data item is assigned a numerical value of Data_ID+1 relative to the previous Data_ID value. In some embodiments, the data ID counter is an n-bit counter in which n is selected such that the data ID counter does not overflow over the anticipated lifespan of the data storage system. For example, the maximum count value of the data ID counter is configured to be higher than a maximum count value that may possibly be reached based on factors such as a total capacity, maximum write bandwidth, and life expectancy of the storage system, such that every data item ever written to the storage system will have a unique Data_ID value.

The B+ tree management module 254 and the LSM tree management module 256 are configured to generate and maintain tree data structures (e.g., B+ tree 294 and LSM tree 296) which organize the metadata (e.g., Block_IDs of the data blocks 284, and the Data_IDs of data items contained in the data blocks 284) in a manner that enables the data block utilization tracking system 240 to efficiently track the utilization of the data blocks 284. For example, as explained in further detail below, B+ tree 294 is utilized to implement a lookup and mapping functionality, and the LSM tree 296 is configured to provide write amortization for deleted/invalid data items. Despite that the metadata data structures contain an entry for each data item in the storage system, the size of the metadata structures (e.g., B+ tree 294 and LSM tree 296) are configured to be relatively small such that such metadata structures can fit in the persistent system memory 290 for a large and scalable storage system.

In some embodiments, the data placement management module 260 implements a data placement scheme in which new data items (compressed or not compressed) are only written to empty data blocks, and updated versions of data items are only written to empty data blocks using "out-of-place" updates which results in the previous versions of the data items becoming invalid. More specifically, in some embodiments, the data placement management module 260 implements a write caching process in which data items associated with I/O write requests (new data items, and updated data items) are initially written to the write cache 292 to persist the data while the new incoming data is accumulated to the size of a data block (e.g., 1 MB), and the cached data is written to an empty data block when the size of the cached data is accumulated to the size of a data block.

More specifically, in some embodiments, when incoming data is to be stored, storage control system 210 will divide the incoming data into data items of a given size (e.g., 4 KB, 8 KB, 16 KB, etc.) before data compression, and then proceed to compress each data item (assuming the storage control system 210 implements in-line data compression). The ID assignment module 252 will assign a unique Data_ID to each data item (compressed or non-compressed data item), and the data placement module 260 will initially store the data items to the write cache 292. In this scheme, incoming writes of data items of varied logical offsets are packed into the write cache 292, and the cached data is written to a single physical data block as a whole, once the size of the cached data accumulates to the data block size (e.g., 1 MB). Consequently, the content of a newly written data block will have an ordered set of data items with consecutive Data_IDs.

With the exemplary data placement scheme, no data items will be written to a given data block once the given data block is initially written with a full block of data from the write cache 292. A given data block can be reused and written to once the data items have been removed and the data block has been reclaimed as part of a garbage collection process. The writing of full data blocks provides an advantage of minimizing write overhead because it requires fewer writes to storage. In addition, the writing of full data blocks maximizes efficiency when writing full stripes to a RAID array (e.g., RAID 5 or RAID 6 array).

The physical location of valid data items within the data blocks 284 will change over time as a result of garbage collection operations that are performed by the garbage collection control module 270. The out-of-place writes that are performed by the data placement management module 260 when writing modified data items to empty data blocks results in the previous versions of such data items being deemed invalid, resulting in the fragmentation of data blocks which contain invalid data items. In other words, a previous version of a data item, which has the same logical location of an updated version of the data item, will become invalid when the updated data item (with the same logical location) is written out-of-place to another physical location in a new data block.

The capacity of data blocks which contain invalid data items cannot be reused until such capacity is reclaimed. The garbage collection control module 270 implements garbage collection methods for defragmenting data blocks and reclaiming the capacity of data blocks for reuse. The storage space of the invalid data items in a given data block is reclaimed during garbage collection/defragmentation operations wherein valid data items in the given data block are identified and moved to a new data block, before the given data block is deleted and reclaimed for reuse. As noted herein, when a data block is initially written with data from the write cache 292, the data block will have an ordered set of data items with consecutive Data_IDs, which facilitates tracking which data items in a given data block are valid. Over time, as new data blocks are packed with valid data items from other data blocks that are being garbage collected, a given data block may have two or more sets of consecutive Data_IDs as a result of the garbage collection operations. In any event, in the most random scenario, the average data block will contain mostly consecutive Data_IDs, or at least a few sets of consecutive Data_IDs, as a result of garbage collection operations that are performed over a period of time.

Figure 3:
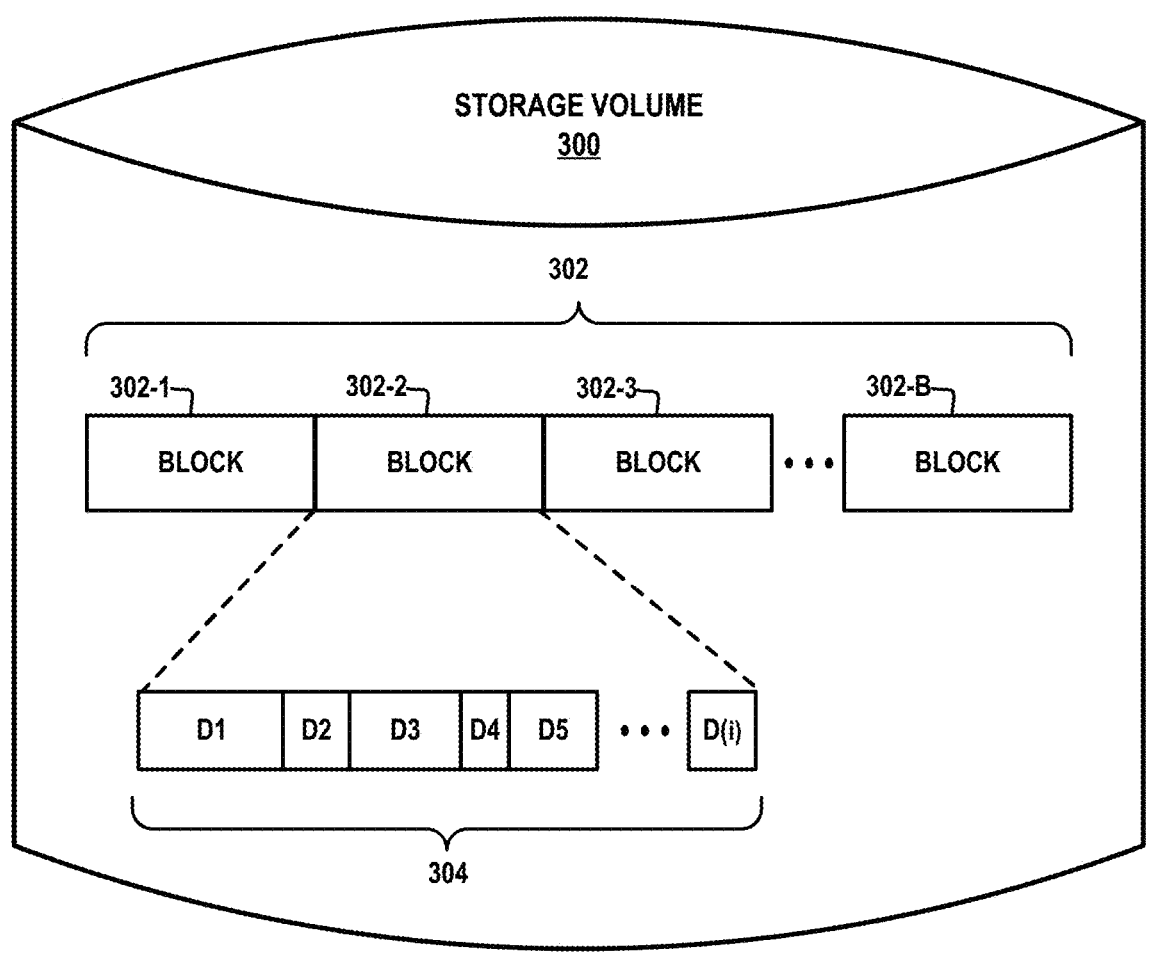
FIG. 3 schematically illustrates a layout of a storage volume organized as an array of data blocks with each data block comprising data items, according to an exemplary embodiment of the disclosure.

FIG. 3 schematically illustrates a layout of a storage volume organized as an array of data blocks with each data block comprising data items, according to an exemplary embodiment of the disclosure. More specifically, FIG. 3 schematically illustrates a storage volume 300 in which the physical capacity associated with the storage volume 300 is divided into a plurality of data blocks 302-1, 302-2, 302-3, . . . , 302-B (collectively, data blocks 302). The storage volume 300 can be allocated from the capacity of storage devices on a single storage node, or the capacity of storage devices on two or more storage nodes. As noted above, in some embodiments, the data blocks 302 are fixed-size data blocks having the same size (e.g., 1 MB).

In addition, each data block 302 comprises a plurality of data items. For example, for illustrative purposes, the data block 302-2 is shown as having a plurality (i) of data items 304 (D1, D2, D3, D4, D5, ..., D(i)). The number of data items in each of the data blocks 302 can be different depending on the sizes of the data items contained in the data blocks 302. The data items 304 can include compressed data, non-compressed data, and both compressed and non-compressed data items. As noted above, a newly written data block will have data items with consecutive data IDs. By way of example, in the exemplary embodiment of FIG. 3, assuming that the data block 302-2 has 10 data items (i=10), the data items D1, D2, D3, D4, D5, ..., D(i) can have respective Data_IDs of 150, 151, 152, 153, 154, ..., 159.

As is known in the art, the storage space of storage devices is organized into addressable storage units, referred to as "allocation units." The allocation units are fixed-size addressable units having a fixed "allocation unit size" or "cluster size" which is defined by the file system or operating system kernel when formatting a storage device. An allocation unit represents the smallest logical block size of storage space that can be used to hold data and which is addressed as one logical unit by the operating system. Each logical block has the same "allocation unit size" which corresponds to a specific number of bytes of physical disk space. For example, for SSDs, the smallest addressable storage unit is a "page," which is composed of several memory cells (common page sizes are 2 KB, 4 KB, 8 KB, or 16 KB). The pages of an SSD are aggregated into blocks, wherein each block comprises, e.g., 128 or 256 pages, depending on the SSD configuration. For HDDs, the smallest addressable storage unit is a "logical data block" which is uniquely addressed using a corresponding logical block address (LBA). In HDDs, a logical block size (e.g., 4 KB) can be equal to the physical sector size, or the logical block size can be a multiple of the physical sector size such that each logical block corresponds to a block of physical sectors. For example, for a physical sector size of 512 bytes, a logical block size can be 8×512 bytes=4,096 bytes.

In the exemplary storage layout of FIG. 3, in some embodiments, each data block 302 comprises a set of contiguous logical data blocks of the physical storage space, wherein each data block includes the same number of logical data blocks. For example, assuming that each data block 302 has a size of 1 MB (in particular, 1,048,576 bytes), and the allocation unit size of the storage is 4 KB (in particular, 4,096 bytes), then each data block 302 comprises a consecutive sequence of 256 logical data blocks. The storage control system 210 (FIG. 2) is configured to support the reading of chunks of data that are integer multiples of an allocation unit size. On the other hand, the data items (e.g., data items 302) that are written to a given data block (e.g., data block 302-2) can have variable sizes (which differ in size from the allocation unit size) such that the data items are not write aligned to allocation units in the given data block.

More specifically, as noted above, incoming data is divided into fixed sized chunks (i.e., data items) of size, e.g., 4 KB, 8 KB, or 16 KB, etc., before data compression (which chunk size is much less than the fixed size (e.g., 1 MB) of the data blocks). When in-line data compression is implemented by the storage control system, the data items are compressed before storage, which can result in reducing the sizes of the data items (e.g., a 4 KB data item can be compressed to a size of 3.5 KB). In this regard, the variable size data items are tightly packed into a free data block, and not necessarily write-aligned to the device allocation units within the free data block. When performing a given read operation for a data item in the given data block, the given read operation is performed by expanding to the nearest allocation size. For example, a data item written from an offset 4.5 KB to 10 KB within the given data block will be performed by reading the allocation units from an offset of 4 KB to an offset of 12 KB.

As noted above, the metadata management module 250 is configured to generate metadata, such as block IDs, and data IDs, and organize the metadata using tree data structures (e.g., B+ tree 294 and LSM tree 296) in a manner that enables the data block utilization tracking system 240 to efficiently track the utilization of the data blocks 284. The management of the tree data structures is implemented based on, e.g., new data blocks being written in their entirely, and data items being assigned incremental data IDs, which allows the metadata to be organized/sorted in tree data structures based on the incremental data IDs. Exemplary methods for organizing metadata in B+ tree and LSM tree data structures to track the utilization of data blocks in a storage system will now be discussed in further detail in conjunction with FIGS. 4 and 5.

Figure 4:
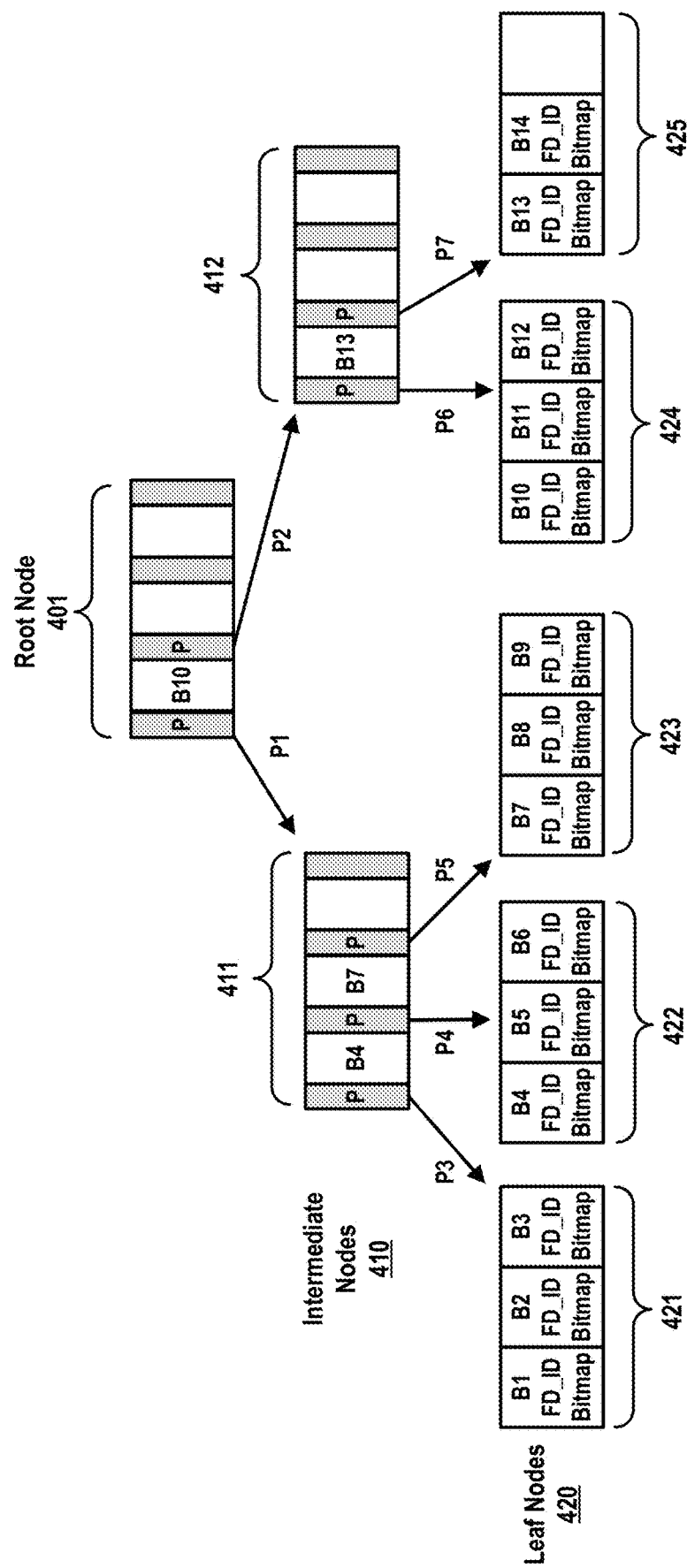
FIG. 4 schematically illustrates an exemplary B+ tree data structure which is implemented for tracking the utilization of data blocks in a storage system, according to an exemplary embodiment of the disclosure.

For example, FIG. 4 schematically illustrates an exemplary B+ tree data structure 400 which is implemented for tracking the utilization of data blocks in a storage system, according to an exemplary embodiment of the disclosure. The exemplary B+ tree data structure 400 comprises three levels of nodes including a root level comprising a root node 401, an intermediate node level 410, and a leaf node level 420. The intermediate node level 410 comprises two intermediate nodes 411 and 412, and the leaf node level 420 comprises five leaf nodes 421, 422, 423, 424, and 425, wherein all leaf nodes are in the same level of the B+ tree data structure 400. For ease of illustration, FIG. 4 depicts an exemplary B+ tree data structure 400 which is configured, at a given point in time, to enable random access to sorted records that are associated with, e.g., fourteen data blocks having respective Block_IDs of B1, B2, B3, B4, B5, B6, B7, B8, B9, B10, B11, B12, B13 and B14.

Furthermore, for ease of illustration, the exemplary B+ tree data structure 400 is an n-order tree structure, wherein n=3. The "order" of a B+ tree data structure denotes a maximum number of key fields that a given node can have. For n=3, the internal nodes and leaf nodes can have at most n=3 key fields and n+1=4 pointer fields. In addition, when n=3, each leaf node must have a least two (2) entries, and each non-leaf node must have at least one (1) entry and two (2) pointers. In practice, the order n of the B+ tree data structure 400 would be in the hundreds, or thousands, etc. In this regard, while the exemplary embodiment of FIG. 4 shows the exemplary B+ tree data structure 400 having three levels of nodes (the root node 401 level, the intermediate node level 410, and the leaf node level 420 level), it is to be understood that at any given time, there can be zero (0) to N intermediate levels of nodes. For example, as is known in the art, a B+ tree structure grows from the leaf nodes upwardly. In this regard, at some period of time, the B+ tree may only have leaf nodes, with zero (0) non-leaf nodes.

In the exemplary B+ tree data structure 400, the non-leaf nodes 401, 411, and 412 include keys and pointers, wherein the Block_ID values of B1, B2, B3, B4, B5, B6, B7, B8, B9, B10, B11, B12, B13, and B14 serve as the key values. The leaf nodes 421, 422, 423, 424, and 425 comprise data records. Each data record comprises (i) a unique Block_ID value (which serves as the key value to the data record), (ii) a first data ID (FD_ID) which denotes the first Data_ID of the given data block having the associated Block_ID, and (iii) a bitmap which maps each consecutive Data_ID of the given data block, starting from FD_ID, to a bit which indicates whether or not the given Data_ID is valid or invalid. In other words, for each data record mapped to a given data block (Block_ID), the associated bitmap will provide an indication of the Data_IDs of all valid data items within the given data block. For example, if a given data item is valid, the bit value in the bitmap will be set to "1" for the given (valid) data item. On the other hand, if a given data item is invalid (because of an out-of-place update, or deletion of the data item), the bit value in the bitmap will be set to "0" for the given (invalid) data item. The use of the bit map as an indicator of valid and invalid data item is facilitated by sequential/consecutive Data_IDs of the data items within the given data block. In some embodiments, each data record (Block_ID, FD_ID, Bitmap) has a constant size and is ordered by the key value (Block_ID), such that the items in a given leaf node can be found using a binary search. Exemplary embodiments of block data records will be discussed in further detail below in conjunction with FIGS. 9A, 9B, 9C, and 9D.

The B+ tree data structure 400 is configured to organize the metadata in a manner which enables efficient mapping and lookup functionality for data records of data blocks, which are contained in the leaf nodes 421, 422, 423, 424, and 425, wherein such data records provide information regarding which data items are contained in a given data block and data items are in a given data block are valid or invalid. In the exemplary embodiment of FIG. 4, the root node 401 comprises a key value B10, with a pointer P1 to the intermediate node 411, and a pointer P2 to the intermediate node 412. The root node 401 comprises two empty key fields and two empty pointer fields, which can be used when new data blocks are added to the B+ tree data structure 400. The pointer P1 points to a branch of the B+ tree data structure 400 having nodes with key values (i.e., Block_ID) that are less than the key value of B10. The pointer P2 points to a branch of the B+ tree data structure 400 having nodes with key values that are greater than, or equal to, the key value of B10. More specifically, the pointer P1 points to the intermediate node 411, while the pointer P2 points to the intermediate node 412.

As further shown in FIG. 4, the intermediate node 411 comprises key values of B4 and B7, and pointers P3, P4, and P5. The intermediate node 411 includes one empty key field and one empty pointer field, which can be used when new data blocks are added to the B+ tree data structure 400. The pointer P3 points to the leaf node 421 having data records with key values of B1, B2, and B3, which are less than the key value of B4. The pointer P4 points to the leaf node 422 having data records with key values of B4, B5, and B6, which are greater than or equal to the key value of B4, but less than the key value of B7. The pointer P5 points to the leaf node 423 having data records with key values of B7, B8, and B9, which are greater than or equal to the key value of B7, but less than the key value of B10.

Furthermore, the intermediate node 412 comprises a key value of B13 and pointers P6 and P7. The intermediate node 412 comprises two empty key fields and two empty pointer fields, which can be used when new data blocks are added to the B+ tree data structure 400. The pointer P6 points to the leaf node 424 having data records with key values of B10, B11, and B12, which are less than the key value of B13. The pointer P7 points to the leaf node 425 having data records with key values of B13 and B14, which are greater than or equal to the key value of B13. The leaf node 425 comprises an empty data record, which can be used when new data blocks are added to the B+ tree data structure 400.

The B+ tree data structure 400 comprises a dynamic multilevel indexing data structure which can grow and shrink as data block records are added or removed from the B+ tree structure. The B+ tree data structure grows from the bottom up by the addition of new leaf nodes when new data blocks are written to storage. For example, as shown in FIG. 4, if a new data record for a new data block with a Block_ID of B15 is added to the B+ tree data structure 400, the new data record would be added to the empty record field of the existing leaf node 425. Moreover, if another data record for a new data block with a Block_ID of B16 is added to the B+ tree data structure 400, a new leaf node would need to be generated, which would result in a change the indexing information of the intermediate node 412 and/or the intermediate node 411 to adjust for the new leaf node, using B+ tree insertion methods well-known to those of ordinary skill in the art.

Figure 5:
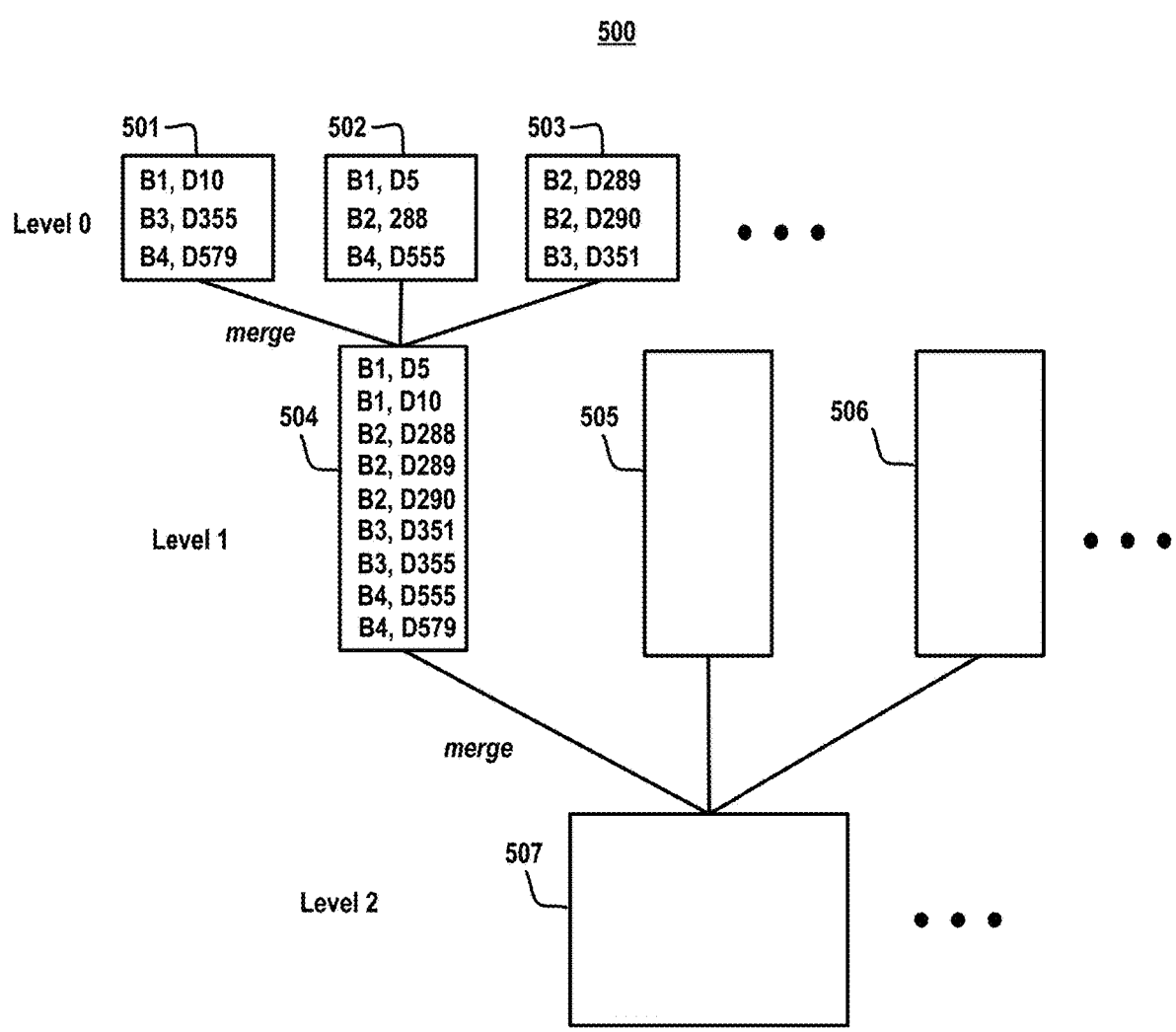
FIG. 5 schematically illustrates an exemplary log-structured merge (LSM) tree data structure which is implemented for tracking the utilization of data blocks in a storage system, according to an exemplary embodiment of the disclosure.

FIG. 5 schematically illustrates an exemplary LSM tree data structure 500 which is implemented for tracking the utilization of data blocks in a storage system, according to an exemplary embodiment of the disclosure. The exemplary LSM tree data structure 500 comprises three segment levels including Level 0, Level 1, and Level 2. The LSM tree data structure 500 is configured to enable write amortization for data items that become invalid as a result of out-of-place updates and deletion of such data items. The exemplary LSM tree data structure 500 comprises a plurality of segments 501, 502, 503, 504, 505, 506, and 507. Each segment comprises a plurality of records which are sorted in a given order. Each record within a given segment comprises a <Block_ID, Data_ID> pair, where the Block_ID denotes the value of a given data block ID (which is used as a key value in the exemplary B+ tree data structure 400, FIG. 4), and where the Data_ID denotes the value of a given data item ID of a data item within the given data block with the Block_ID, which is deemed invalid.

For ease of illustration and discussion, the implementation of the exemplary LSM tree data structure 500 as shown in FIG. 5 will be discussed in the context of the invalidation of data items associated with data blocks with Block_IDs of B1, B2, B3, and B4, wherein it is assumed that the data blocks B1, B2, B3, and B4 were initially written with data items having consecutive increasing Data_ID values. As data items within the data blocks B1, B2, B3, and B4 become invalid over time (via deletion or out-of-place updates), a record is generated and stored in an in-memory buffer (e.g., cache) in a sorted manner (sometime referred to as a memory table, or memtable). When a given number of records are generated, the sorted records are stored in an immutable LSM segment. For example, as shown in FIG. 5, each segment 501, 502, and 503 in Level 0 of the LSM tree data structure 500 comprises three records.

In particular, the segment 501 includes three records, <B1, D10>, <B3, D355>, and <B4, D579>, which are stored according to the Block_ID values and the Data_ID values. The segment 502 includes three records, <B1, D5>, <B2, D288>, and <B5, D555>, which are stored according to the Block_ID values and the Data_ID values. Similarly, the segment 503 includes three records, <B2, D289>, <B2, D290>, and <B3, D351>, which are stored according to the Block_ID values and the Data_ID values. The Level 0 segments are continuously generated as more data items of data blocks become invalid. In this manner, batches of out-of-place writes and deletions of data items of the data blocks are saved, sequentially, to a set of smaller files (e.g., segments in Level 0) in the LSM tree data structure, wherein each segment in Level 0 comprises a batch of invalidated data items covering a short period of time. Each segment is stored to enable fast searching, and each segment is immutable (never updated), such that new records of invalid data items are added to new segments in Level 0.

Periodically, multiple segments in a given Level of the LSM tree data structure 500 are merged together to reduce the number of segments that need to be searched. For example, as shown in FIG. 5, the segments 501, 502, and 503 in Level 0 are merged to form the segment 504 in Level 1 of the LSM tree data structure 500. The segment 504 aggregates the records from each of the segments 501, 502, and 503, and stores such records in a sorted order based on the Block_ID values and the associated Data_ID values. While not specifically shown in FIG. 5, the segments 505 and 506 in Level 1 of the LSM tree data structure 500 could each have a plurality of sorted records aggregated from merging different blocks of three segments in Level 0 of the LSM tree data structure 500. Moreover, the segment 507 in Level 2 of the LSM data tree structure 500 could have a plurality of sorted records as a result of merging the segments 504, 505, and 506 in Level 2 of the LSM tree data structure 500.

A relationship between a given B+ tree data structure and LSM tree data structure is that the size of the LSM tree data structure is coordinated with the size of the B+ tree data structure in such a way that the number of records in the lower level (e.g., Level 2) of the LSM tree is much greater than the number leaf nodes of the B+ tree data structure. This ensures that a single write operation of a leaf node of the B+ tree data structure will be performed to update the bitmap of a given Block_ID for many data items (Data_ID) associated with the given Block_ID, and not just one data item. In this regard, the implementation of the LSM tree data structure (for amortizing deletion and out-of-place updates of data items to track invalid data items) in conjunction with a B+ tree data structure advantageously serves to reduce the write overhead associated with the B+ tree data structure, as the bitmap of a given data block does not need to be accessed and updated each time a given data item in the given data block becomes invalid (via a deletion or an out-of-place update).

Figure 6:
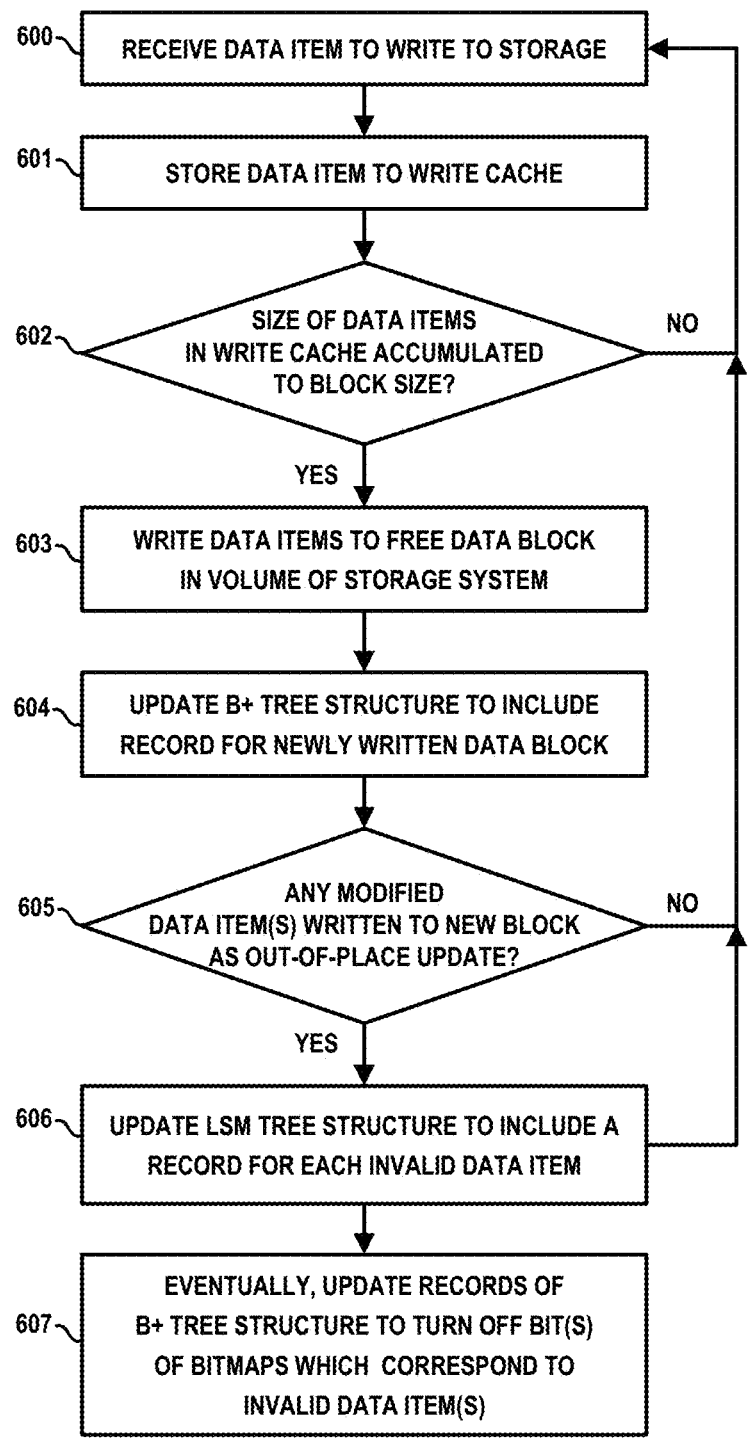
FIG. 6 illustrates a flow diagram of a method for tracking the utilization of data blocks in a storage system, according to an exemplary embodiment of the disclosure.

FIG. 6 illustrates a flow diagram of a method for tracking the utilization of data blocks in a storage system, according to an exemplary embodiment of the disclosure. In some embodiments, the process flow of FIG. 6 illustrates an exemplary mode of operation of the data block utilization tracking system 240 of FIG. 2 and thus, for illustrative purposes, the process of FIG. 6 may be discussed in the context of system module/components shown in FIG. 2. During operation, the storage control system 210 will receive I/O write requests from users, and the data block utilization tracking system will receive the data items associated with the I/O write requests to write to the storage system (block 600). The system will store each received data item to a write cache (block 601). As noted above, in some embodiments, the data placement management module 260 implements a write caching process in which data items associated with I/O write requests (new data items, and updated data items) are initially written to the write cache 292 to persist the data items while the new incoming data is accumulated to the size of a data block (e.g., 1 MB).

When the amount of the cached data accumulates to the size of a data block (affirmative result in block 602), the cached data will be written to a free data block in a given volume of the storage system (block 603). More specifically, when the cached data items in the write cache accumulates to the size of a data block, the cached data items will be written to a free data block, wherein the data items written to the free data block will be assigned Data_IDs having consecutive values. An associated B+ tree data structure will then be updated to include an entry (e.g., record) for the newly written data block (block 604). For example, in some embodiments, the B+ tree management module 254 will generate a new record for the new data block, wherein the new record will comprises the Block_ID assigned to the newly written data block (which serves as the key value of the record), the Data_ID value of the first data item (FD_ID) of the data block, and the associated bitmap for the new data block in which the bits mapped to the data items are initially set to "1" to indicate that the data items are valid. The new record will be added to an existing leaf node of the B+ tree data structure (assuming the appropriate leaf node is not full), or new leaf node is generated, and the keys of the indexing nodes (e.g., intermediate nodes and/or root node) will be updated as needed (e.g., splitting index nodes) so that the resulting B+ tree data structure complies with the specified "order" of the B+ tree data structure.

When the cached data items are written to a new data block (block 604), there can be one or more data items which are not new data items, but rather updated/modified versions of existing data items that are already stored in other data blocks. In this instance, the writing of an updated/modified data item in a free data block constitutes an out-of-place update, which results in the invalidation of the previous version of the data item. In this regard, if one or more data items were written to the new data block as out-of-place updates (affirmative determination in block 605), the associated LSM tree data structure will be updated to include a new record for each data item that was invalidated due to the out-of-place updates of the associated updated/modified data items (block 606). As noted above, in some embodiments, an LSM record comprises a <Block_ID, Data_ID> pair, where Data_ID denotes the unique data item ID of the invalid data item, and where the Block_ID denotes the unique data block ID of the data block which contains the invalid data item.

Eventually, the records contained in the leaf node of the B+ tree data structure will be updated to turn off the bits (e.g., set the bit values to 0) of the bitmaps which correspond to the invalid data items for which new LSM records were added to the LSM tree data structure following a previous update of the LSM tree data structure (block 607). The update of the bitmaps of the B+ tree data structure can be performed on a periodic basis, or in response to some predefined triggering event which triggers the update of the B+ tree data structure, as specified by the system configuration.

FIG. 7 illustrates a flow diagram of a method for tracking the utilization of data blocks in a storage system, according to an exemplary embodiment of the disclosure. In particular, FIG. 7 illustrates an exemplary process flow which is performed by the data block utilization tracking system 240 (FIG. 2) when a data item is deleted. During operation, the storage control system 210 may receive a request to delete a given data item (block 700). When the given data item is deleted, the LSM tree data structure will be updated to include a new record for the deleted item (block 701). For example, the new LSM record will include a <Block_ID, Data_ID> pair, where Data_ID denotes the unique data item ID of the deleted data item, and where the Block_ID denotes the unique data block ID of the data block which contains the deleted data item. The B+ tree data structure is not immediately updated in response to the deletion of the data item. Instead, the records contained in the leaf node of the B+ tree data structure will eventually be updated to turn off the bits (e.g., set the bit values to 0) of the bitmaps which correspond to the deleted data items (as well as invalid data items) for which new LSM records were added to the LSM tree data structure following a previous update of the LSM tree data structure (block 702).

FIG. 8 illustrates a flow diagram of a method for performing a garbage collection operation, according to an exemplary embodiment of the disclosure. In general, a garbage collection operation is performed to reclaim the capacity of one or more data blocks which include stale data (e.g., invalid data items and/or deleted data items), which further results in defragmenting the storage. In some embodiments, FIG. 8 illustrates an exemplary mode of operation of the garbage collection control module 270 (FIG. 2), when a garbage collection process is commenced (block 800). In some embodiments, a garbage collection process can be performed asynchronously, in the background (e.g., during periods of idle time between I/O requests sent to the storage system), to reclaim the capacity of fragmented data blocks and generate empty data blocks that can be reused to perform full writes (e.g., block 603, FIG. 6).

In general, the garbage collection control module 270 will select one or more data blocks for garbage collection (block 801). Various techniques can be implemented to select a given data block for the garbage collection/defragmentation process including, e.g., greedy techniques which are based on a number of invalid data items within target data blocks that are considered for selection, or other techniques that take into account a combination of factors including, but not limited to, the number of invalid data items within the target data blocks, and an estimated wear-level of the data blocks that are considered for selection. For example, a given data block in which all data items are all invalid can be selected for reclaim and reuse. In this instance, the entire data block can be reclaimed without having to move valid data items of the selected data block to another data block. A data block can be selected for garbage collection based on a policy of choosing a data block with a maximum number of invalid items.

When a given data block is selected for garbage collection (block 801), the garbage collection process will search the B+ tree data structure using the Block_ID of the selected data block as a key to access the leaf node record of the selected data block, and determine the Data_ID of each valid data item in the given data block based on the bit values of the bitmap of the accessed record (block 802). In some embodiments, the LSM tree data structure can also be searched to determine if any additional invalid data items exist in the selected data block (block 803). In particular, there can be a circumstance in which the leaf node records of the B+ tree data structure are somewhat outdated, wherein the bitmap information associated with the selected data block has not been updated using information of invalid data items of the selected data block based on newly added records in the LSM tree data structure. In this manner, the additional information, if any, obtained from the records of the LSM tree data structure can be used to identify additional invalid data items (for which the corresponding bits in the bitmap have not been updated) before spending resources on copying invalid data items out of the selected data block being garbage collected.

The valid data items of the selected data block are read and temporarily buffered (e.g., cache) to enable a full write to a free data block. Once the valid data items are moved to a new data block, the selected data block (which has been garbage collected) is reclaimed and ready for reuse, and the B+ tree data structure is updated to remove the record associated with the reclaimed data block (block 804). It is to be noted that when the valid data items are temporarily cached and moved to a new data block, the valid data items will have the same unique Data_ID that was originally assigned to such data items when originally written to storage.

If more data blocks need to be processed for garbage collection (affirmative determination is block 805), the garbage collection operation will be repeated (e.g., return to block 801). On the other hand, if no more data blocks need to be processed for garbage collection (negative determination in block 805), the garbage collection process will terminate (block 806) and subsequently recommenced when needed. Once the garbage collection is complete, the record associated with the data block that was reclaimed for reuse can simply be removed from the B+ tree data structure, without the need to update the LSM tree data structure as part of the garbage collection transaction. Instead, the LSM records associated with the reclaimed data block can eventually be removed from the LSM tree data structure using a background merge process implemented by, e.g., the LSM tree management module 256, when traversing the LSM tree to identify records with Block_ID keys for data blocks which no longer contain the Data_IDs which are referenced to the by Block_ID keys.

FIGS. 9A, 9B, 9C, and 9D schematically illustrate a method for performing a garbage collection operation, according to an exemplary embodiment of the disclosure. More specifically, FIGS. 9A, 9B, 9C, and 9D schematically illustrate data block records that are generated and updated over time as data items within data blocks are invalidated, and the data blocks are garbage collected by moving valid data items of multiple data blocks to free data blocks. For example, FIG. 9A schematically illustrates a data block record 900 (e.g., B+ tree leaf node record) for a data block with a Block_ID=2. For illustrative purposes, it is assumed that the data block record 900 comprises information for a data block (Block_ID=2) having ten (10) data items with consecutive Data_ID values of 550, 551, 552, 553, 554, 555, 556, 557, 558, and 559, respectively. In this regard, the data block record 900 comprises a bitmap 901 which includes a sequence of bits, and a first Data_ID, FD_ID=550, which corresponds to a first data item having a Data_ID=550 for the set of data items with the consecutive Data_ID values of 550, 551, 552, 553, 554, 555, 556, 557, 558, and 559. In FIG. 9A, all bits of the bitmap 901 are set to "1" which indicates that all data items of the given data block (Block_ID=2) are valid.

Next, FIG. 9B illustrates a state of the data block record 900 at some point in time where the data items having the Data_ID values of 551, 553, 555, 557, and 558 in the given data block (Block_ID=2) have been invalidated (as a result of deletions or out-of-place updates of updated versions of such data items). As such, the corresponding bits in the bitmap are set to "0" for the invalid data items having the Data_ID values of 551, 553, 555, 557, and 558, while the corresponding bits in the bitmap for the valid data items having the Data_ID values of 550, 552, 554, 556, and 559 remain set a "1" to indicate that such data items are valid.

Next, FIG. 9C schematically illustrates a record 910 (e.g., B+ tree leaf node record) for a data block with a Block_ID=4. For illustrative purposes, it is assumed that the data block record 910 comprises information for a data block (Block_ID=4) having ten (10) data items with consecutive Data_ID values of 880, 881, 882, 883, 884, 885, 886, 887, 888, and 889, respectively. In this regard, the data block record 910 comprises a bitmap 911 which includes a sequence of bits, and a first Data_ID, FD_ID=880, which corresponds to a first data item having a Data_ID=880 for the set of data items with the consecutive Data_ID values of 880, 881, 882, 883, 884, 885, 886, 887, 888, and 889. FIG. 9C further illustrates a state of the data block record 910 at some point in time following the initial creation of the data block record 910, where the data items with the Data_ID values of 880, 881, 883, 887, and 888 have been invalidated (as a result of deletions or out-of-place updates of updated versions of such data items), as indicated by the corresponding bits in the bitmap being set to "0" for the invalid data items, while the bits in the bitmap for the valid data items with the Data_ID values of 882, 884, 885, 886, and 889 remain set to "1."

Next, FIG. 9D schematically illustrates a new data block record 920 that is generated for a data block with a Block_ID=10, which results from a garbage collection operation in which the valid data items from the data block with Block_ID=2 (FIG. 9B) are combined with the valid data items from the data block with Block_ID=4 (FIG. 9C). In this regard, the new data block record 920 comprises a bitmap with two portions 921 and 922, which include information from the respective bitmaps 901 and 911 of the data block records 900 and 910. The bitmap information of the data block record 920 indicates that the data block (Block_ID=10) includes ten (10) data items with Data_ID values of 550, 552, 554, 556, 559, 882, 884, 885, 886, and 889, which are the valid data items that were moved into the new data block from the garbage collected data blocks of FIGS. 9B and 9C as a result of the garbage collection operation.

For the portion 921 of the bitmap of the data block record 920, the FD_ID is set to the Data_ID value of 550 since the data item with Data_ID=550 is the first valid block in the set of valid data blocks obtained from the data block with Block_ID=2 (FIG. 9B). On the other hand, for the portion 922 of the bitmap of the data block record 920, the FD_ID is set to the Data_ID value of 882 (as opposed to the Data_ID value of 880) since the data items with Data_ID values of 880 and 881 in the data block with Block_ID=4 (FIG. 9C) were invalid at the time of the garbage collection operation. As noted above, after completion of the garbage collection operation, the data block (Block_ID=10) has ten (10) valid data items (Data_ID values of 550, 552, 554, 556, 559, 882, 884, 885, 886, and 889). In this regard, the garbage collection process packs the valid data items into a free data block, while the associated bitmap information is not compacted (except for the removal of information regarding invalid data bits prior to the first valid data items in the respective portion of the bitmaps).

It is to be understood that the bitmap information of a data block record enables the storage control system to determine which data items are valid in manner that does not require the bits of the bitmap to correspond to the actual locations/offsets of the respective data items in the given data block. For example, as shown in FIG. 9D, the portion 921 of the bitmap has bit values of <1, 0, 1, 0, 1, 0, 1, 0, 0, 1> starting from the first valid data item, FD_ID=550. In this regard, since the data items corresponding to the portion 921 of the bitmap have consecutive Data_ID values, the sequence of bits <1, 0, 1, 0, 1, 0, 1, 0, 0, 1> starting from FD_ID=550 provides an indication that the data items with Data_ID values of 550, 552, 554, 556, and 559 are valid. Similarly, for the data items corresponding to the portion 922 of the bitmap, the sequence of bits <1, 0, 1, 1, 1, 0, 0, 1> starting from FD_ID=882 provides an indication that the data items with Data_ID values of 882, 884, 885, 886, and 889 are valid.

It is to be appreciated that there are various advantages to implementing an out-of-place write scheme which utilizes continuously increasing consecutive Data_ID values for each data item (new or updated version) written to storage. For example, the use of consecutive Data_ID values allows the assigned Data_ID values to be represented in data block records using dense bitmaps. Furthermore, the Data_ID values are not repeated or reused, thereby allowing stale LSM records to remain for some time in the LSM tree data structure. Moreover, the metadata that is used for address translation (e.g., local to physical) can be sorted by Data_ID values such that the metadata items associated with the data items of a given data block can be stored together, which leads to a highly efficient garbage collection process which needs to read all such metadata.

Furthermore, it is to be appreciated that there are various advantages to implementing a metadata management scheme using the two tree data structures (e.g., B+ tree and LSM tree) for optimized purposes. For example, when a free data block is written with data items, the B+ tree data structure will be updated to include a record for the newly written data block. Since a data block is relatively large in size (e.g., 1 MB), the overhead of performing a single write operation to add a new record to a leaf node of the B+ tree data structure is relatively insignificant. When existing data items in one or more data items become invalid (as a result of the data items being deleted, or out-of-place updates of updated/modified versions of the data items), the associated bitmaps of the records in the leaf nodes of the B+ tree data structure are not immediately updated to turn off bits associated with the invalid data items.

Instead, to avoid the overhead associated with updating the B+ tree data structure each time a data item is invalidated, the LSM tree data structure is updated to include a data record for the contains only deletions. In this regard, the LSM tree data structure provides an efficient write amortization scheme which coalesces and batches out-of-place updates and deletions of data items in a more efficient manner, than using the B+ tree data structure. While stale records may exist in the LSM tree data structure, which are associated with data blocks that have been reclaimed and possibly reused, these stale LSM records do not pose any problem in the exemplary metadata management scheme in which all new data items written to a data block of storage (e.g., original data items or updated/modified data items) will always have a unique Data_ID. In this instance, Data_IDs are never reused and, thus, stale LSM records can simply be ignored since the Data_IDs of such records will not exist in the data block.

As noted above, the LSM tree data structure is configured to provide indexed access to records of invalidated or deleted data items, wherein the records are added to the LSM tree data structure with high insert volume. The information of the LSM records (e.g., Block_ID, Data_ID pairs) regarding invalid/deleted data items is propagated down the LSM tree data structure, and once such records reach the lowest level of the LSM tree, the information of such LSM records is applied to the B+ tree data structure by turning off bits within bitmaps, which correspond to the deleted Data_ID. The size of the LSM tree data structured is defined to accumulate a number of changes that is xN larger that the number of leaves in the B+ tree data structure, where N is a customizable constant. When the records in a leaf segment of the LSM tree for a given data block are applied to the record in the leaf node of the of the B+ tree data structure for the given data block, there will be 1 write per N changes, in the worst case.

In summary, advantages to the exemplary systems and methods for tracking data block utilization include, but are not limited to, (i) the ability to generate records in the B+ tree data structure using bitmaps with bits that are mapped to consecutively increasing Data_ID values, (ii) the ability to directly update records of the B+ tree data structure, while bypassing the LSM tree data structure without sacrificing correctness, and (iii) the ability to directly apply garbage collection to the B+ tree data structure, while bypassing the LSM tree data structure without sacrificing correctness. In addition, the implementation of the B+ tree and LSM tree data structures provide memory efficient metadata structures which allow the metadata needed for tracking utilization of data blocks to be stored in system memory (e.g., RAM) with a relatively small footprint, as well as persisting the utilization of all data blocks with minimal I/O, and enabling the swapping of in and out of memory.

Figure 10:
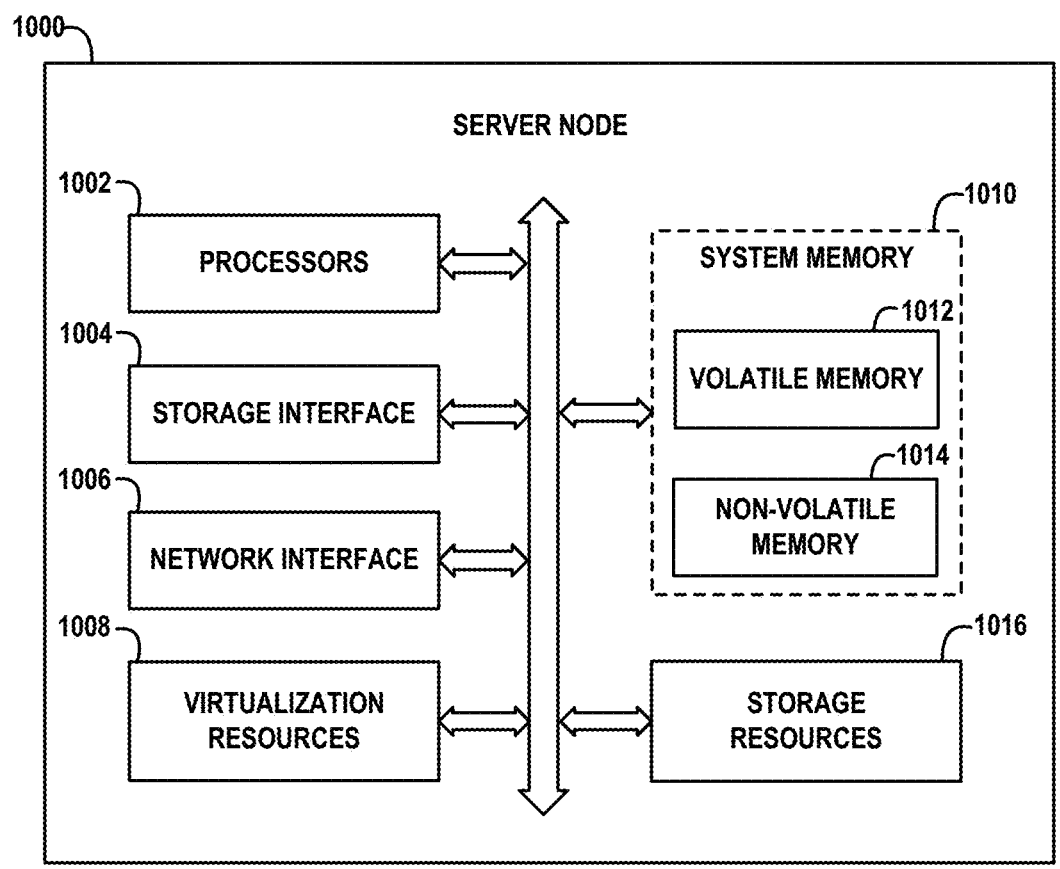
FIG. 10 schematically illustrates a framework of a server node for hosting a storage node which comprises a data block utilization tracking system, according to an exemplary embodiment of the disclosure.

FIG. 10 schematically illustrates a framework of a server node for hosting a storage node which comprises a data block utilization tracking system, according to an exemplary embodiment of the disclosure. The server node 1000 comprises processors 1002, storage interface circuitry 1004, network interface circuitry 1006, virtualization resources 1008, system memory 1010, and storage resources 1016. The system memory 1010 comprises volatile memory 1012 and non-volatile memory 1014. The processors 1002 comprise one or more types of hardware processors that are configured to process program instructions and data to execute a native operating system (OS) and applications that run on the server node 1000.

For example, the processors 1002 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 1004 enables the processors 1002 to interface and communicate with the system memory 1010, the storage resources 1016, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 1006 enables the server node 1000 to interface and communicate with a network and other system components. The network interface circuitry 1006 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 1008 can be instantiated to execute one or more services or functions which are hosted by the server node 1000. For example, the virtualization resources 1008 can be configured to implement the various modules and functionalities of a host connectivity management system as discussed herein. In one embodiment, the virtualization resources 1008 comprise virtual machines that are implemented using a hypervisor platform which executes on the server node 1000, wherein one or more virtual machines can be instantiated to execute functions of the server node 1000. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 1000, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 1008 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 1000 as well execute one or more of the various modules and functionalities of a storage control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage nodes and data block utilization tracking systems (as shown in FIGS. 1 and 2) and the methods for tracking data block utilization as discussed herein (e.g., FIGS. 6, 7, and 8) are implemented using program code that is loaded into the system memory 1010 (e.g., volatile memory 1012), and executed by the processors 1002 to perform respective functions as described herein. In this regard, the system memory 1010, the storage resources 1016, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 1010 comprises various types of memory such as volatile RAM, NVRAM, or other types of memory, in any combination. The volatile memory 1012 may be a dynamic random-access memory (DRAM) (e.g., DRAM DIMM (Dual In-line Memory Module), or other forms of volatile RAM. The non-volatile memory 1014 may comprise one or more of NAND Flash storage devices, SSD devices, or other types of next generation non-volatile memory (NGNVM) devices. The system memory 1010 can be implemented using a hierarchical memory tier structure wherein the volatile system memory 1012 is configured as the highest-level memory tier, and the non-volatile system memory 1014 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 1002 to execute a native operating system and one or more applications or processes hosted by the server node 1000, and to temporarily store data that is utilized and/or generated by the native OS and application programs and processes running on the server node 1000. The storage resources 1016 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
managing, by a storage control system, a utilization of data blocks of a storage volume, wherein at least a portion of the storage volume is partitioned into data blocks, wherein each data block comprises a unique block identifier (ID) and has a same block size, wherein managing the utilization of data blocks of the storage volume comprises:

receiving data items to be stored in the storage volume;
assigning a respective unique data ID value to each data item, wherein the assigned unique data ID values comprise consecutive numerical ID values;
writing a data block in the storage volume by writing the data items to a free data block in the storage volume such that the free data block is written as a whole data block; and
updating a metadata structure which comprises a first tree data structure and a second tree data structure, wherein updating the metadata structure comprises:
inserting a record for the written data block into a node of the first tree data structure, wherein the record comprises (i) the unique block ID of the written data block, (ii) a first unique data ID value of the consecutive numerical ID values of the data items in the written data block, and (iii) a bitmap which maps each of the consecutive numerical ID values of the data items in the written data block, starting from the first unique data ID value, to a respective bit whose value is set to indicate whether the data item associated with the unique data ID value is valid or invalid; and
inserting a record into a node of the second tree data structure, wherein the record comprises a given unique block ID and unique data ID value associated with an existing data item that is deemed invalid.

2. The method of claim 1, wherein the first tree data structure comprises a B+ tree data structure having nodes that are indexed and sorted according to the unique block IDs of used data blocks of the storage volume.

3. The method of claim 1, wherein:
receiving the data items to be stored in the storage volume comprises storing the received data items in a cache memory; and
writing the data items to the free data block in the storage volume comprises writing the cached data items to the free data block when a total size of the cached data items in the cache memory accumulates to the size of the free data block.

4. The method of claim 1, wherein when a given data item written to the free data block comprises an updated data item of an existing data item stored in a given data block of the storage volume, inserting the record into the node of the second tree data structure comprises:
invalidating the existing data item; and
inserting a record for the invalidated data item in the second tree data structure, wherein the record comprises (i) the unique block ID assigned to the given data block which comprises the invalidated data item, and (ii) the unique data ID value assigned to the invalidated data item;
wherein the second tree data structure is configured to provide an index of records associated with invalidated and deleted data items.

5. The method of claim 4, wherein the second tree data structure comprises a log-structured merge (LSM) tree data structure, wherein the records in the LSM tree data structure are indexed and sorted according to the unique block IDs and unique data ID values.

6. The method of claim 4, wherein managing the utilization of data blocks of the storage volume further comprises:
deleting a data item stored in a data block in the storage volume; and
inserting a record for the deleted data item in the second tree data structure, wherein the record comprises (i) the unique block ID assigned to the data block which comprises the deleted data item, and (ii) the unique data ID value assigned to the deleted data item.

7. The method of claim 4, wherein managing the utilization of data blocks of the storage volume further comprises:
accessing a plurality of records in the second tree data structure for a given data block in the storage volume, wherein the plurality of records are associated with data items of the given data block which have been invalidated or deleted; and
updating the bitmap of the associated record for the given data block in the first tree data structure using the accessed records of the given data block in the second tree data structure.

8. The method of claim 4, wherein managing the utilization of data blocks of the storage volume further comprises:
performing a garbage collection process to reclaim a selected data block in the storage volume, wherein performing the garbage collection process comprises:
searching the first tree data structure using the unique block ID of the selected data block to access a record associated with the selected data block;
utilizing the bitmap of the accessed record to determine which data items in the selected data block are valid data items;
moving the valid data items of the selected data block to a free data block of the storage volume; and
reclaiming the selected data block as a free data block for reuse.

9. The method of claim 8, wherein performing the garbage collection process further comprises searching records in the second tree data structure using the unique block ID of the selected data block to determine if any of the data items determined to be valid as a result of the search of the first tree data structure, have been invalidated or deleted subsequent to a last update of the bitmap associated with the selected data block.

10. An article of manufacture comprising a non-transitory processor-readable storage medium having stored therein program code of one or more software programs, wherein the program code is executable by one or more processors to implement a method which comprises:
managing, by a storage control system, a utilization of data blocks of a storage volume, wherein at least a portion of the storage volume is partitioned into data blocks, wherein each data block comprises a unique block identifier (ID) and has a same block size, wherein managing the utilization of data blocks of the storage volume comprises:
receiving data items to be stored in the storage volume;
assigning a respective unique data ID value to each data item, wherein the assigned unique data ID values comprise consecutive numerical ID values;
writing a data block in the storage volume by writing the data items to a free data block in the storage volume such that the free data block is written as a whole data block; and
updating a metadata structure which comprises a first tree data structure and a second tree data structure, wherein updating the metadata structure comprises:
inserting a record for the written data block into a node of the first tree data structure, wherein the record comprises (i) the unique block ID of the written data block, (ii) a first unique data ID value of the consecutive numerical ID values of the data items in the written data block, and (iii) a bitmap which maps each of the consecutive numerical ID values of the data items in the written data block, starting from the first unique data ID value, to a respective bit whose value is set to indicate whether the data item associated with the unique data ID value is valid or invalid; and
inserting a record into a node of the second tree data structure, wherein the record comprises a given unique block ID and unique data ID value associated with an existing data item that is deemed invalid.

11. The article of manufacture of claim 10, wherein the first tree data structure comprises a B+ tree data structure having nodes that are indexed and sorted according to the unique block IDs of used data blocks of the storage volume.

12. The article of manufacture of claim 10, wherein:
the program code for receiving the data items to be stored in the storage volume comprises program code for storing the received data items in a cache memory; and
the program code for writing the data items to the free data block in the storage volume comprises program code for writing the cached data items to the free data block when a total size of the cached data items in the cache memory accumulates to the size of the free data block.

13. The article of manufacture of claim 10, wherein when a given data item written to the free data block comprises an updated data item of an existing data item stored in a given data block of the storage volume, the program code for inserting the record into the node of the second tree data structure comprises program code for:
invalidating the existing data item; and
inserting a record for the invalidated data item in the second tree data structure, wherein the record comprises (i) the unique block ID assigned to the given data block which comprises the invalidated data item, and (ii) the unique data ID value assigned to the invalidated data item;
wherein the second tree data structure is configured to provide an index of records associated with invalidated and deleted data items.

14. The article of manufacture of claim 13, wherein the second tree data structure comprises a log-structured merge (LSM) tree data structure, wherein the records in the LSM tree data structure are indexed and sorted according to the unique block IDs and unique data ID values.

15. The article of manufacture of claim 13, wherein the program code for managing the utilization of data blocks of the storage volume further comprises program code for:
deleting a data item stored in a data block in the storage volume; and
inserting a record for the deleted data item in the second tree data structure, wherein the record comprises (i) the unique block ID assigned to the data block which comprises the deleted data item, and (ii) the unique data ID value assigned to the deleted data item.

16. The article of manufacture of claim 13, wherein the program code for managing the utilization of data blocks of the storage volume further comprises program code for:
accessing a plurality of records in the second tree data structure for a given data block in the storage volume, wherein the plurality of records are associated with data items of the given data block which have been invalidated or deleted; and
updating the bitmap of the associated record for the given data block in the first tree data structure using the accessed records of the given data block in the second tree data structure.

17. The article of manufacture of claim 13, wherein the program code for managing the utilization of data blocks of the storage volume further comprises program code for:
- performing a garbage collection process to reclaim a selected data block in the storage volume, wherein the program code for performing the garbage collection process comprises program code for:
- searching the first tree data structure using the unique block ID of the selected data block to access a record associated with the selected data block;
- utilizing the bitmap of the accessed record to determine which data items in the selected data block are valid data items;
- moving the valid data items of the selected data block to a free data block of the storage volume; and
- reclaiming the selected data block as a free data block for reuse.

18. The article of manufacture of claim 17, wherein the program code for performing the garbage collection process further comprises program code for searching records in the second tree data structure using the unique block ID of the selected data block to determine if any of the data items determined to be valid as a result of the search of the first tree data structure, have been invalidated or deleted subsequent to a last update of the bitmap associated with the selected data block.

19. An apparatus, comprising:
- a data storage node comprising at least one processor, and memory configured to store program code, wherein the program code is executable by the at least one processor to instantiate a storage control system, wherein the storage control system is configured to manage a utilization of data blocks of a storage volume, wherein at least a portion of the storage volume is partitioned into data blocks, wherein each data block comprises a unique block identifier (ID) and has a same block size, wherein in managing the utilization of data blocks of the storage volume, the storage control system is configured to:
- receive data items to be stored in the storage volume;
- assign a respective unique data ID value to each data item, wherein the assigned unique data ID values comprise consecutive numerical ID values;
- write a data block in the storage volume by writing the data items to a free data block in the storage volume such that the free data block is written as a whole data block; and
- update a metadata structure which comprises a first tree data structure and a second tree data structure, wherein in updating the metadata structure, the storage control system is configured to:
- insert a record for the written data block into a node of the first tree data structure, wherein the record comprises (i) the unique block ID of the written data block, (ii) a first unique data ID value of the consecutive numerical ID values of the data items in the written data block, and (iii) a bitmap which maps each of the consecutive numerical ID values of the data items in the written data block, starting from the first unique data ID value, to a respective bit whose value is set to indicate whether the data item associated with the unique data ID value is valid or invalid; and
- insert a record into a node of the second tree data structure, wherein the record comprises a given unique block ID and unique data ID value associated with an existing data item that is deemed invalid.

20. The apparatus of claim 19, wherein when a given data item written to the free data block comprises an updated data item of an existing data item stored in a given data block of the storage volume, the storage control system, in inserting the record into the node of the second tree data structure, is further configured to:
- invalidate the existing data item; and
- insert a record for the invalidated data item in the second tree data structure, wherein the record comprises (i) the unique block ID assigned to the given data block which comprises the invalidated data item, and (ii) the unique data ID value assigned to the invalidated data item;
- wherein the second tree data structure is configured to provide an index of records associated with invalidated and deleted data items.

* * * * *